(12) United States Patent
Escaffre et al.

(10) Patent No.: US 9,296,176 B2
(45) Date of Patent: Mar. 29, 2016

(54) HIGH CELLULOSE CONTENT, LAMINIFEROUS NONWOVEN FABRIC

(75) Inventors: Pascale Escaffre, La côte Saint André (FR); Gordon Meikle, Duns Berwickshire (GB); Brian Nortman, Appleton, WI (US)

(73) Assignee: Suominen Corporation, Helsinki (FI)

( * ) Notice: Subject to any disclaimer, the term of this patent is extended or adjusted under 35 U.S.C. 154(b) by 984 days.

(21) Appl. No.: 13/386,139

(22) PCT Filed: Jul. 20, 2010

(86) PCT No.: PCT/FI2010/050603
§ 371 (c)(1),
(2), (4) Date: Apr. 2, 2012

(87) PCT Pub. No.: WO2011/009997
PCT Pub. Date: Jan. 27, 2011

(65) Prior Publication Data
US 2012/0177888 A1    Jul. 12, 2012

(30) Foreign Application Priority Data
Jul. 20, 2009    (FI) ..................................... 20095800

(51) Int. Cl.
*B32B 3/30*        (2006.01)
*B32B 5/26*        (2006.01)
(Continued)

(52) U.S. Cl.
CPC . *B32B 5/26* (2013.01); *B32B 23/02* (2013.01); *B32B 37/0084* (2013.01); *B32B 37/12* (2013.01);
(Continued)

(58) Field of Classification Search
CPC ........................................................ D04H 1/52
See application file for complete search history.

(56) References Cited

U.S. PATENT DOCUMENTS

| 2,045,095 A | 6/1936 | Osborne et al. |
| 3,379,811 A | 4/1968 | Hartmann et al. |

(Continued)

FOREIGN PATENT DOCUMENTS

| CA | 841938 | 5/1970 |
| DE | 299 13 054 | 12/1999 |

(Continued)

OTHER PUBLICATIONS

International Search Report for International Application No. PCT/FI2010/050603, mailed on Apr. 7, 2011.
(Continued)

*Primary Examiner* — Ian Rummel
(74) *Attorney, Agent, or Firm* — Pearl Cohen Zedek Latzer Baratz LLP

(57) ABSTRACT

The present invention provides a laminiferous nonwoven fabric with a high woodpulp content suitable for use in wipes, absorbent articles and other applications, and a method of making the same. The laminiferous nonwoven comprises 3 layers bonded together, where the outer layers are lightweight meltspun webs and the middle layer comprises mainly woodpulp fibers. Each of the first (3), second (2) and third (4) nonwoven layer are preferably first formed separately and individually to be self-supported webs, whereafter the three self-supported webs are brought together essentially immediately before bonding them together. When used as a substrate for wet wipes, the inventive fabric exhibits a combination of several useful properties; good wet and dry softness and bulk, good wet abrasion resistance and low wet linting propensity, and where the majority raw material is woodpulp.

17 Claims, 6 Drawing Sheets

(51) Int. Cl.
*D04H 3/04* (2012.01)
*B32B 23/02* (2006.01)
*B32B 37/00* (2006.01)
*B32B 37/12* (2006.01)
*B32B 38/06* (2006.01)

(52) U.S. Cl.
CPC ............ *B32B 38/06* (2013.01); *B32B 2305/20* (2013.01); *B32B 2317/18* (2013.01); *Y10T 428/24529* (2015.01); *Y10T 428/24942* (2015.01)

(56) References Cited

U.S. PATENT DOCUMENTS

| | | |
|---|---|---|
| 3,485,706 A | 12/1969 | Evans et al. |
| 3,560,326 A | 2/1971 | Bunting et al. |
| 3,575,749 A | 4/1971 | Kroyer |
| 3,634,573 A | 1/1972 | Wagner et al. |
| 3,802,817 A | 4/1974 | Matsuki et al. |
| 3,849,241 A | 11/1974 | Butin et al. |
| 3,855,046 A | 12/1974 | Hansen et al. |
| 4,100,324 A | 7/1978 | Anderson et al. |
| 4,144,122 A | 3/1979 | Emanuelsson et al. |
| 4,333,979 A | 6/1982 | Sciaraffa et al. |
| 4,432,833 A | 2/1984 | Breese |
| 4,442,161 A | 4/1984 | Kirayoglu et al. |
| 4,482,429 A | 11/1984 | Klowak |
| 4,494,278 A | 1/1985 | Kroyer et al. |
| 4,666,390 A | 5/1987 | Kenworthy et al. |
| 4,731,215 A | 3/1988 | Schwarz |
| 4,784,892 A | 11/1988 | Storey et al. |
| 4,808,467 A | 2/1989 | Suskind et al. |
| 4,939,016 A | 7/1990 | Radwanski et al. |
| 5,009,747 A | 4/1991 | Viazmensky et al. |
| 5,284,703 A | 2/1994 | Everhart et al. |
| 5,350,624 A | 9/1994 | Georger et al. |
| 5,441,550 A * | 8/1995 | Hassenboehler et al. ....... 55/486 |
| 5,458,592 A | 10/1995 | Abuto et al. |
| 6,013,223 A | 1/2000 | Schwarz |
| 6,013,323 A | 1/2000 | Klayder et al. |
| 6,315,114 B1 | 11/2001 | Keck et al. |
| 8,138,107 B2 | 3/2012 | Bornemann et al. |
| 8,343,612 B2 | 1/2013 | Soder et al. |
| 2005/0133174 A1 | 6/2005 | Gorley et al. |
| 2005/0148261 A1 | 7/2005 | Close et al. |
| 2009/0023839 A1 | 1/2009 | Barnholtz et al. |
| 2009/0104831 A1 | 4/2009 | Bornemann et al. |

FOREIGN PATENT DOCUMENTS

| | | |
|---|---|---|
| DE | 10 2006 020 488 | 10/2007 |
| DE | 10 2006 037 111 | 2/2008 |
| DE | 10 2006 044 496 | 4/2008 |
| DE | 20 2008 007008 | 8/2008 |
| EP | 0 992 338 A2 | 4/2000 |
| EP | 1 156 147 A1 | 11/2001 |
| EP | 1 493 555 A1 | 1/2005 |
| GB | 1102246 | 2/1968 |
| WO | WO 96/34136 A1 | 10/1996 |
| WO | WO 97/30223 | 8/1997 |
| WO | WO 2004024044 A1 * | 3/2004 |

OTHER PUBLICATIONS

Choi et al, "Strength Properties of Melt Blown Nonwoven Webs," Polymer Engineering and Science, Jan. 1988, vol. 28, No. 2, pp. 81-89.

Datasheet, "Spunbond-Thermally bonded nonwovens-point bonded," Johns Manville, May 2000.

Dutton, Kathryn C. "Overview and Analysis of the Meltblown Process and Parameters," Journal of Textile and Apparel, Technology and Management, vol. 6, Issue 1, Fall 2008, pp. 4-10.

Presentation entitled "Future Trends in Nonwoven Industry and Advanced Machine Technology," presented by Rudiger Weinhardt for Fleissner GmbH, The Exclusive Club for PET Users, Artimino, Oct. 4, 2007, G.S.I. Global Service International Srl, <www.gsiplastic.com/pet_day_2007_programma.htm>, accessed Mar. 26, 2014.

Van A. Wente, "Superfine Thermoplastic Fibers," Industrial and Engineering Chemistry, vol. 48, No. 8 (1956), pp. 1342-1346.

* cited by examiner

HIGH CELLULOSE CONTENT, LAMINIFEROUS NONWOVEN FABRIC

CROSS-REFERENCE TO RELATED APPLICATIONS

This application is a National Phase Application of PCT International Application No. PCT/FI2010/050603, International Filing Date, 20 Jul. 2010, claiming priority to Finnish Application No. 20095800, filed 20 Jul. 2009, both of which are hereby incorporated by reference in their entirety.

FIELD OF THE INVENTION

The present invention relates to nonwoven laminiferous composite fabrics, and a method for making nonwoven laminiferous composite fabrics.

BACKGROUND OF THE INVENTION

Nonwoven fabrics have been around for many years and today there are a number of different nonwoven production technologies being used commercially. One important area of application for nonwoven fabrics is in the field of wiping materials, also known as "wipes" or "wipers". Wipes are used for a large number of purposes in industrial, domestic, institutional and personal cleaning settings. Within these applications, a common requirement is that the wipe be absorbent towards water and aqueous solutions, or towards certain solvents in the case of industrial wipes. Wipes are often sold and packaged in a pre-moistened state as 'wet wipes'. Other common requirements of wipes include the ability to remove and retain dirt, softness, bulk, and strength appropriate to the intended use, and a low propensity to lint (shed fibres and/or particles). When the wipe is intended to be used in the wet state, the aforementioned properties are usually measured as 'wet properties' after the nonwoven fabric has been suitably wetted. It is intended that many wipes be single-use (e.g. baby and personal hygiene wipes) or limited re-use articles (e.g. some types of kitchen wipes). Current trends in the field of consumer wipes (baby wipes, personal hygiene wipes, and domestic cleaning wipes including disinfection wipes), place emphasis on cleaning performance, economy, and concern for the environment. The consumer requires a high level of cleaning performance, that is, principally dirt removal whilst leaving little or no residual lint or streaks on the wiped surface. Reducing the basis weight of a wipe needed to perform a particular cleaning task will consume fewer raw materials per wipe, and will be more economical. The basis weight of baby and personal hygiene wet wipes is generally from about 40 gsm to about 65 gsm, and the basis weight of consumer domestic cleaning and disinfection wet wipes is generally from about 40 gsm to about 55 gsm. There is increasing public concern over the use of natural resources being utilised in the manufacture of wiping articles whose use is of limited duration. Hence there is growing consumer demand for wipes produced with less environmental impact, for example wipes made from a high percentage of renewable and sustainable materials, and preferably wipes which are biodegradable after use.

Woodpulp is used in various types of nonwoven fabrics made by different technologies. Although nonwoven fabrics made from woodpulp fibres are known to be absorbent, nonwoven fabrics made entirely of pulp fibres may be undesirable for certain wiping applications because they lack adequate strength and abrasion resistance, and are prone to shed pulp fibres during use. A wipe is often used to clean a surface by rubbing the wipe on the surface. The action of rubbing abrades the surface of the wipe. If the material used to make the wipe has a low resistance to abrasion, this results in the wipe having relatively poor durability and an excessive number of fibres or other particles are likely to detach from the wipe and contaminate the wiped surface. This is particularly the case when the wiping substrate contains woodpulp. In the past nonwoven fabrics with a high pulp content have been strengthened by either the application of chemical binders, and/or by using other bonding techniques such as hydro-entanglement. Each of these approaches has drawbacks. For example, the use of man-made chemical binder dispersions adds cost, generally increases energy consumption during manufacture due to the need for additional drying of the web, and may cause undesirable streaking when the wipe is used to clean a hard surface such as glass. Due to the short length of woodpulp fibres (generally less than 4 mm, and commonly about 2 mm), hydro-entanglement of 100% w/w woodpulp webs with high pressure water jets has only a limited effect. Generally longer fibres or filaments must be mixed with the pulp fibres, or otherwise provided, such that the woodpulp fibres can 'wrap around' the longer fibres or filaments during the hydro-entanglement process. Examples of the hydroentanglement of woodpulp fibres in the presence of longer fibres are disclosed in Canadian patent 841,938 and U.S. Pat. No. 5,009,747. Hydro-entanglement with high pressure water jets is a high energy process, and a further consequence is the densification of the nonwoven fabric, i.e. reduction of web thickness and bulk during hydroentanglement. High wood pulp content, hydro-entangled nonwoven fabrics may still lint to an unacceptable degree, and require further treatment such as addition of a chemical binder.

A number of meltspun technologies have been used to make nonwoven fabrics. Meltspun nonwovens can be made from a range of thermoplastic resins including (but not exclusively) polymers and/or copolymers of olefins, esters, amides, urethanes, and vinyl compounds such as vinyl chloride, vinyl alcohol, and vinyl acetate. The resin(s) may include those made from sustainable sources such as poly (lactic acid) and other plant derived thermoplastics. The spunbond process produces multiple, essentially continuous, polymer filaments which are laid on a moving foraminous surface to form a loose web, which is commonly then bonded by means of heated calender rolls. Spunbond webs are generally strong and porous. U.S. Pat. No. 3,802,817 describes the spunbond process and equipment. The meltblown process was first developed in the 1950's to provide advanced filtration materials, as described in Van A. Wente in Industrial and Engineering Chemistry, Volume 48, No. 8 (1956). U.S. Pat. Nos. 3,379,811, 3,634,573 and 3,849,241 describe the process. Meltblown webs are usually weaker than the equivalent weight spunbond web, but have smaller pores, and as such are often used in filtration applications. The two technologies can be combined to make composite fabrics such as the 3-layer spunbond-meltblown-spunbond, or 'SMS' composite fabric, which combines the strength of spunbond with the filtration capability of meltblown webs. The product of another hybrid technology is the so called high strength meltblown nonwoven whose method of manufacture is described in U.S. Pat. Nos. 4,731,215 and 6,013,223. Although the use of 100% w/w synthetic meltspun webs as wiping materials has been described in U.S. Pat. No. 6,315,114B1 and in US patent application 2005/133174A1, such wipes are more commonly used in professional and industrial applications rather than as consumer wipes. Meltspun webs have been combined with woodpulp, usually through hydro-entanglement, to make nonwovens suitable for use as wiping materials. U.S. Pat.

Nos. 4,442,161, 4,808,467 and 4,939,016 describe such woodpulp-meltspun web composites.

Nonwoven technologies used today to make wiping materials with a high percentage woodpulp content include coform, airlaid and hydroentangled composites.

A coform nonwoven is a sheet material comprising an intimate blend of meltblown filaments (usually polypropylene filaments) and cellulose fibres (usually woodpulp fibres). In the coform process, woodpulp fibres (typically about 70% by weight of the fabric) are individualised, transported in an airstream which is combined with a second airstream carrying meltblown filaments. The combined airstreams deposit the fibrous materials on a foraminous surface. Coform-type processes and fabrics are described in U.S. Pat. Nos. 4,100,324 and 5,350,624. Coform nonwoven fabrics are usually bulky and soft, but generally have relatively poor wet abrasion resistance, resulting in a higher linting propensity.

In the airforming process, the woodpulp fibres (typically 70% or more by weight of the fabric) are individualised using, for example, a hammer mill, transported in an airstream to a distribution device which distributes the fibres substantially uniformly in the cross-direction of the production machine. After passing through the distribution device, the fibres are deposited on a foraminous moving surface by means of an airflow created by vacuum boxes below the surface. Other materials such as man-made fibres, powders or particulates may be mixed with the woodpulp fibres. The airformed web may be bonded by a number of methods including heat activated binders and/or application of liquid binders. U.S. Pat. No. 3,575,749 describes the airlaid process, and U.S. Pat. No. 4,494,278 describes a fibre distribution device used to make airformed webs. When airformed webs are used to make wiping substrates, the strength of the web is strengthened by spraying or otherwise applying a liquid binder, typically an aqueous synthetic latex dispersion, to one or both web surfaces which must then be dried and cured. By applying the liquid binder principally to the web surfaces, the detachment of fibres (also known as shedding or linting) from the surfaces of the substrate is reduced. A recent embodiment of the airlaid process for the production of wiping materials is the so called multi-bond airlaid (MBAL) process. In the MBAL process, thermoplastic binder fibres (typically about 30% by weight of the fabric) are blended with woodpulp fibres. The binder fibres are typically of a sheath: core bicomponent configuration, where the sheath polymer has a lower melting point than the polymer comprising the fibre core. After depositing the blend of woodpulp fibres and binder fibres on a foraminous surface to form a web, the web passes through an oven where the binder fibres bond to neighbouring fibres, thereby strengthening the web. Additionally a light application of a liquid binder, typically an aqueous synthetic latex dispersion, is applied to one or both surfaces of the web to reduce the number of fibres detaching during use as a wipe. Airlaid webs, including multi-bond airlaid webs, are usually bulky, can be soft depending on choice of binder(s), but have poor wet abrasion resistance, resulting in a higher linting propensity.

Hydro-entangled nonwoven composites of woodpulp and other fibres or filaments have long been known. U.S. Pat. Nos. 3,485,706 and 3,560,326 describe hydro-entangled composites of polyester staple fibres and woodpulp. U.S. Pat. Nos. 4,442,161 and 4,808,467 describe hydro-entangled composites of spunbond webs and woodpulp. Such nonwoven composites generally contain less than about 70% by weight woodpulp fibres. U.S. Pat. No. 5,284,703 describes a composite fabric made by hydro-entangling woodpulp into a spunbond web, and where the woodpulp content of the composite nonwoven is at least 70% by weight. Depending on the choice of raw materials, such woodpulp containing hydroentangled webs may have good wet abrasion resistance, but are not very soft or bulky, and are typically used to make industrial or hard surface wipes.

Testing of commercial samples of wipes made from the aforementioned nonwoven technologies, demonstrates that they have either good wet abrasion resistance, or good wet bulk, or low linting propensity, but not all these desirable properties together. It is an object of the present invention to provide an improved nonwoven wiping material with the combination of good wet bulk, good wet abrasion resistance and with a low propensity for linting, and with a high woodpulp content of at least 50% by weight.

DEFINITIONS

As used herein, the term "Airforming or Airlaying" shall mean the well-known process by which a fibrous nonwoven layer can be formed. In the airforming process, bundles of small fibres having typical lengths ranging from 1 to 50 mm are separated and entrained in an air supply and then deposited onto a forming screen, usually with the assistance of a vacuum supply. The randomly deposited fibres may, if desired, be bonded to one another using, for example, a chemical adhesive, and/or thermal bonding. The terms airlaying and airforming are used interchangeably herein.

As used herein, the term "Attenuation" shall mean the act of drawing or stretching a hot thermoplastic filament in its length direction. In the meltblown and spunbond processes, attenuation or stretching is usually effected by a gas (normally air) flowing at high speed in the same direction as, and essentially parallel to the movement of the filaments. Attenuation has the simultaneous effects of reducing filament diameter, increasing the alignment of polymer molecules along the filament's length, and increasing the tenacity of the filament.

As used herein, the term "Basis Weight" shall mean the weight of a sheet material per unit area, for example in grams per square meter (gsm or g/m2) or ounces per square yard (osy). Note: the conversion factor is 1 osy=33.91 gsm.

As used herein, the term "Bicomponent fibre" shall mean a fibre that has been formed from two different polymers. At the start of the filament production process, the two polymers are melted and processed through separate equipment, before being brought to each spinhole in the spinneret to be spun together in a pre-arranged configuration to form a single filament or fibre. Typically, two separate polymers are extruded, although a bicomponent fibre may encompass extrusion of the same polymeric material from separate extruders. The extruded polymers are arranged in substantially constantly positioned distinct zones within the cross-section of the bicomponent fibres and extend substantially continuously along the length of the bicomponent fibres. Several types of bicomponent fibre cross-sectional configurations are known, non-limiting examples include sheath: core, side-by-side, multi-segment pie, and islands-in-a-sea. The cross-section configuration of bicomponent fibres can be symmetric (e.g., concentric sheath and core, or side-by-side of equal portions), or can be asymmetric (e.g., offset core within sheath, or side-by-side segments of unequal proportions). The two polymers may be present in ratios of, for example (but not exclusively), 75/25, 50/50 or 25/75. Tricomponent fibres, made from three polymers, are also known.

As used herein, the term "Biconstituent fibre or filament" shall mean a fibre or filament that has been formed from a mixture of two or more polymers extruded from extruder as a blend. Biconstituent fibres or filaments do not have the various polymer components arranged in relatively constantly positioned distinct zones across the cross-sectional area of the fibre and the various polymers are usually not continuous along the entire length of the fibre or filament, instead usually forming fibrils which start and end at random.

As used herein, the term "Binder" shall mean an adhesive material used to bind a web of fibres together or to bond one web to another. The principal properties of a binder are adhesion and cohesion. The binder can be in solid form, for example a powder, film or fibre, in liquid form, for example a solution, dispersion or emulsion or in foam form.

As used herein, the term "Bulk" shall mean the inverse of density as applied to nonwoven fabrics. Bulk (in cubic centimeters per gram, cc/g) is calculated from the thickness of the nonwoven fabric (in microns) divided by the basis weight of the nonwoven fabric (in grams per square meter, gsm). Wet and dry bulk are calculated from the wet and dry thickness of the nonwoven fabric respectively.

As used herein, the term "Calendering" shall mean the process of smoothing the surface of the paper, nonwoven or textile sheet by pressing it between opposing surfaces. The opposing surfaces include flat platens and rollers. Either or both of the opposing surfaces may be heated.

As used herein, the term "Card" shall mean a machine designed to separate individual fibres from a mass of unordered fibres, to align the fibres and deliver the aligned fibres as a batt or web. The fibres in the web can be aligned either randomly or essentially parallel with each other and predominantly in the machine direction. The card consists of a series of rolls and drums that are covered with a plurality of projecting wires or metal teeth.

As used herein, the term "Carded web" shall mean a nonwoven web of fibres produced by carding.

As used herein, the term "Carding" shall mean a process for making nonwoven webs on a card.

As used herein, the term "Cellulose fibre" shall mean a fibre comprised substantially of cellulose. Cellulosic fibres come from manmade sources (for example, regenerated cellulose fibres or lyocell fibres) or natural sources such as cellulose fibres or cellulose pulp from woody and non-woody plants. Woody plants include, for example, deciduous and coniferous trees. Non-woody plants include, for example, cotton, flax, esparto grass, kenaf, sisal, abaca, milkweed, straw, jute, hemp, and bagasse.

As used herein, the term "Cellulose material" shall mean a material comprised substantially of cellulose. The material may be a fibre or a film. Cellulosic materials come from manmade sources (for example, regenerated cellulose films and fibres) or natural sources such as fibres or pulp from woody and non-woody plants.

As used herein, the term "Coform material" shall mean a sheet material comprising an intimate blend of meltblown filaments and cellulose fibres, formed by combining airstreams carrying each material type, and forming a sheet material by depositing the said materials on a foraminous surface. Other materials such as fibres, flakes or particulates may be added to the airstream(s), and are incorporated into the coform sheet material by this means.

As used herein, the term "Comprising" shall mean the various components, ingredients or steps which can be conjointly employed in practising the present invention. Accordingly, the term "comprising" encompasses the more restrictive terms "consisting essentially of" and "consisting of".

As used herein, the term "Conventional Meltblown Process" shall mean the well known process of manufacturing meltblown filaments (see separate definition) described by Van A. Wente in Industrial and Engineering Chemistry, Volume 48, No. 8 (1956). One of the primary objectives of the conventional meltblown process is the production of fine polymer filaments for use in high efficiency filter media, and in which case the necessity to produce strong filaments is a lesser consideration.

As used herein, the term "Conjugate fibre" shall mean a fibre that has been formed by extruding polymer sources from separate extruders and spun together to form a single fibre. A conjugate fibre encompasses the use of two or more separate polymers each supplied by a separate extruder. The extruded polymers are arranged in substantially constantly positioned distinct zones across the cross-section of the conjugate fibre and extend substantially continuously along the length of the conjugate fibre. The shape of the conjugate fibre can be any shape that is convenient to the producer for the intended end use, e.g., round, trilobal, triangular, dog bone shaped, flat or hollow.

As used herein, the term "Cross Machine Direction (CD)" shall mean the direction perpendicular to the machine direction.

As used herein, the term "Denier" shall mean a unit used to indicate the fineness of a filament given by the weight in grams for 9,000 meters of filament. A filament of 1 denier has a mass of 1 gram for 9,000 meters of length.

As used herein, the term "Embossing" shall mean the process of creating a three-dimensional image or design in paper, nonwovens, or other ductile materials. In the field of nonwovens, the equipment used is typically a two roll calender, at least one roll of which bears the desired emboss pattern. The two calender rolls counter-rotate at about the same speed, one or both rolls may be heated, and usually there is a mechanism to controllably press one roll against the other. A nonwoven web is passed between the rolls, and emerges with a pattern embossed on at least one of its surfaces.

As used herein, the term "Fabric" shall mean a nonwoven sheet material, usually air permeable, made from fibres and/or filaments. The terms "fabric" and "web" are used herein interchangeably.

As used herein, the term "Fibre" shall mean a material form characterized by a high ratio of length to diameter. Fibres are generally not continuous in length, and may be of natural origin or man-made. Fibres may be designated as short or long (see separate definitions).

As used herein, the term "Filament" shall mean a material form characterized by a very high ratio of length to diameter. Filaments are produced from a variety of polymers by extruding a molten polymer material through a spinneret. During filament production, it is usually intended that filaments be substantially continuous in length, but occasionally some filaments may break, reducing their length.

As used herein, the term "high cellulose content composite nonwoven fabric" shall mean a fabric, comprised substantially of natural cellulose fibres. The natural cellulose fibres comprise at least 50% by weight of the composite nonwoven fabric.

As used herein, the term "high strength meltblown filament" shall mean meltblown filaments made by a meltblown process that is intermediate between the conventional meltblown process and the conventional spunbond process. A description of the process and apparatus used is given in U.S. Pat. No. 6,013,323. In the high strength meltblown process, a polymer grade(s) with a relatively high average molecular weight (similar to the polymer grade(s) used in the spunbond process) is used versus the lower average molecular weight polymer grade(s), with a higher melt flow rate, normally used in the production of conventional meltblown filaments. Use of such a polymer grade(s) with a relatively high average molecular weight generally produces meltblown filaments with a higher tenacity.

As used herein, the term "high strength meltblown" shall mean a nonwoven sheet material made from high strength meltblown filaments, and which is stronger as made than a nonwoven sheet of the same basis weight and of the same polymer made by the conventional meltblown process. Note that this comparison is based on there being no additional bonding processes, e.g. thermal point-bonding.

As used herein, the terms "laminiferous nonwoven" and "laminiferous composite nonwoven" shall mean a nonwoven fabric made by bringing together two or more layers of sheet materials, followed by a bonding process, and in which there is little mixing of the sheet materials at the interface between layers.

As used herein, the term "Long fibre" shall mean a fibre having an average length of at least 25 mm and up to about 200 mm or more.

As used herein, the term "Lyocell" shall mean a manmade cellulose material obtained by the direct dissolution of cellulose in an organic solvent without the formation of an intermediate compound, and subsequent extrusion of the solution of cellulose and organic solvent into a coagulating bath.

As used herein, the term "Male-Female embossing" shall mean an embossing process using two counter-rotating metal calender rolls, one of which (the "male" roll) is engraved such that raised areas ("boss points") project from the surface of the roll, and the other roll (the "female" roll) is engraved with impressions or pockets machined into the roll surface which are complementary to, and exactly match the shape and spacing of the male boss points. The size of the female impressions is usually a little larger than the corresponding male boss points. It is also possible for each roll to incorporate both male boss points and female impressions—when two such rolls are brought together, the male boss points and female impressions of each roll match up exactly with the complementary features of the other roll. The two rolls counter-rotate in register, and at the same speed. One or both of the rolls may be heated. When a sheet material is fed between the two rotating rolls, the sheet material is pressed into the female impressions by means of the corresponding male boss points. The resulting embossed sheet material is said to be male-female embossed. U.S. Pat. No. 4,333,979 illustrates a male-female embossing process and equipment. Alternate terms for this process include out-of-plane embossing, and 3-dimensional (3-D) embossing.

As used herein, the term "Machine Direction (MD)" shall mean the direction of travel of the forming surface onto which fibres are deposited during formation of a nonwoven web material.

As used herein, the term "Melt Additive" shall mean a material added to and mixed with a polymer in its molten state after which, for example, the molten mixture is extruded into a film, or spun into filaments or fibres. The melt additive generally confers some additional functionality or attribute to the article made from the polymer, non-exclusive examples of which include: renders the article hydrophilic or hydrophobic and/or coloured and/or increases opacity and/or reduces surface gloss and/or renders the article less prone to build-up of static charge.

As used herein, the term "Melt Flow Rate (MFR)" shall mean the rate at which a molten polymer flows under standard measurement conditions, as described in test method ASTM D1238. In the case of polypropylene, the polymer melt temperature is 230° C. and the molten resin is extruded through an orifice of defined dimensions, under a load of 2.16 kilograms. The amount of polymer (in grams) extruded through the orifice in 10 minutes is measured.

As used herein, the term "Meltblown filament" shall mean a filament or fibre formed by extruding a molten thermoplastic material as filaments from a plurality of fine, usually circular, die capillaries into a high velocity, usually hot, gas (e.g. air) stream which attenuates the filaments of molten thermoplastic material to reduce their diameter. Thereafter, the meltblown filaments are carried by the high velocity gas stream and are deposited on a collecting surface to form a web of randomly dispersed meltblown filaments. The meltblown process includes the meltspray process. In a web of meltblown filaments there may be short meltblown fibres and/or long meltblown fibres and/or substantially continuous meltblown filaments depending on the meltblown process parameters.

As used herein, the term "Meltspun nonwoven" shall mean a collective term for nonwoven web materials produced from man-made filaments. Most commonly this includes spunbond nonwovens and meltblown nonwovens, and combinations of these, for example spunbond-meltblown-spunbond laminates. An alternate term with similar meaning is "spunmelt nonwoven".

As used herein, the term "Natural Cellulose Fibre" shall mean a cellulosic fibre produced by nature. A non-exhaustive list of such fibres includes wood fibres (commonly referred to as woodpulp), flax, cotton, jute and sisal. Included in this definition are fibres which have not received any chemical treatment, and also fibres which have been chemically treated. A non-exhaustive list of the latter chemical treatments includes use of pulping chemicals to delignify wood to produce woodpulp, bleaching chemicals, and debonding chemicals used in the production of fluff woodpulp and the like.

As used herein, the term "Non-thermoplastic polymer" shall mean any polymer material that does not fall within the definition of thermoplastic polymer.

As used herein, the term "Nonwoven fabric, sheet or web" shall mean a sheet material having a structure of individual fibres or filaments which are interlaid, but not in an identifiable manner as in a woven or knitted fabric. Nonwoven materials have been formed from many processes such as, for example, meltblowing processes, spunbonding processes, carding processes, air laying processes, and wet laying processes. As used herein a nonwoven sheet includes a wetlaid paper sheet.

As used herein, the term "Point-bonding" shall mean a thermal or ultrasonic bonding technique. Typical thermal point bonding equipment uses at least 2 calender rolls, at least one of which has a plurality of raised points (bosses) on its surface. U.S. Pat. No. 3,855,046 describes typical thermal point-bonding equipment and the process. One specific type of point-bonding is termed pin-to-pin embossing where both rolls have an identical pattern of raised boss points, and where the heated rolls counter-rotate with the boss points in perfect register such that the web is bonded by heat and compression between the raised boss points. Ultrasonic point-bonding uses an engraved calender roll with a plurality of raised bosses and an ultrasonic horn (see definition of "Ultrasonic Bonding" for more details). When a web of fibres or filaments is thermally or ultrasonically bonded with such a calender pattern, the fibres or filaments are bonded together by temperature and pressure in localized areas corresponding to where the boss points make contact with the web. The bosses are usually arranged (but not necessarily) in a regular geometric pattern. The individual bosses may have different shapes—square, round, oval, etc., and typically each individual boss may have an area up to about 10 $mm^2$, although larger boss points are possible. The percentage of the calender roll surface covered by boss points, termed the "bond area", typically ranges from about 5% up to about 50%. For spunbond nonwoven manufacture, a bond area of about 20% is common. Point-bonding a fibrous web generally confers strength to the web whilst retaining some flexibility and drapeability.

As used herein, the term "Polymer" shall mean a chain of repeating, structural units. Generally includes, for example, homopolymers, copolymers, such as for example, block, graft, random and alternating copolymers, terpolymers, etc, and blends and modifications thereof. Furthermore, unless otherwise specifically limited, the term "polymer" includes all possible geometrical configurations. These configurations include, for example, isotactic, syndiotactic and atactic or random symmetries. Alternate terms for polymer include "resin".

As used herein, the term "Regenerated cellulose" shall mean manmade cellulose material obtained by chemical treatment of natural cellulose to form a soluble chemical derivative or intermediate compound and subsequent decomposition of the derivative to regenerate the cellulose. Regenerated cellulose includes spun rayon and cellophane film. Regenerated cellulose processes include the viscose process, the cuprammonium process and saponification of cellulose acetate.

As used herein, the term "Self-supporting web" shall mean a fibrous or filamentous web which has sufficient integrity and strength for it to be handled (for example, to be wound up or unwound from a roll) without requiring any additional support, for example without requiring to be supported by a carrier sheet.

As used herein, the term "Short fibre" shall mean a natural or man-made fibre that has been formed at, or cut to, a length up to 25 mm. It is noted that naturally occurring fibres, such as cellulose, usually do not require cutting as they are formed at a suitable length.

As used herein, the term "Shortcut fibre" shall mean a natural or man-made fibre that has been formed at, or cut to, a length up to ten millimeters. It is noted that naturally occurring fibres, such as cellulose, usually do not require cutting as they are formed at a suitable length.

As used herein, the term "Sided nonwoven" shall mean a sheet of nonwoven material having different fibre compositions and/or different average fibre lengths on its two opposite surfaces.

As used herein, the term "Spunlacing" shall mean a method of bonding a carded nonwoven web by entangling the fibres of that web about adjacent fibres using a plurality of high pressure fluid streams. The fluid may be water. The nonwoven web is supported on a porous surface or screen to allow the fluid to pass through. A negative pressure (vacuum) is applied to the surface side opposing the nonwoven web to draw water from the web through the surface.

As used herein, the term "Spunbond filament" shall mean a filament formed by extruding a molten thermoplastic material as filaments from a plurality of fine, usually circular, capillaries of a spinneret. Shortly after spinning, the filaments are partially quenched and then attenuated by, for example, eductive drawing and/or other well-known spunbonding mechanisms. Attenuation has the simultaneous effect of reducing filament diameter, increasing the alignment of polymer molecules in the filament's length direction, and increasing the tenacity of the filament. Spunbond filaments are generally substantially continuous with deniers within the range of about 0.1 to 10.

As used herein, the term "Spunbond nonwoven" shall mean a nonwoven web formed (usually) in a single process by extruding at least one molten thermoplastic material as filaments from a plurality of fine, usually circular, capillaries of a spinneret. After partial quenching and attenuation, the substantially continuous filaments are laid on a collecting surface as a filamentous batt. The batt is then bonded by one or more techniques including (but not exclusively) thermal bonding including point-bonding, needling, chemical bonding and/or hydro-entanglement.

As used herein, the term "Staple fibre" shall mean a fibre that has been formed at, or cut to, a length of generally one inch to eight inches (25.4 mm to 203.2 mm).

As used herein, the term "Synthetic fibre" shall mean a fibre comprised of man-made material, for example glass, polymer, combination of polymers, metal, carbon, regenerated cellulose or lyocell. The terms "synthetic fibre" and "man-made" fibre are used interchangeably herein.

As used herein, the term "Substantially continuous" shall mean: in reference to the polymeric filaments of a nonwoven web, a majority of the filaments formed by extrusion through orifices remain as continuous, non-broken filaments as they are drawn and collected on a moving surface or other device. Some filaments may be broken during the attenuation or drawing process, with a substantial majority of the filaments remaining continuous.

As used herein, the term "Tex" shall mean a unit used to indicate the fineness of a filament given by the weight in grams for 1,000 meters of filament. A filament of 1 tex has a mass of 1 gram for 1,000 meters of length. A more commonly used unit is the decitex (abbreviated as "dtex") which is the filament mass in grams per 10,000 meters.

As used herein, the term "Thermal Bonding" shall mean the process technology of forming bonds by heating the materials to be bonded. Optionally pressure may be used in combination with the application of heat. In the field of nonwovens, numerous thermal bonding techniques are available including (but not exclusively) thermal point bonding, thermal calendering, oven heating and through air bonding using hot air.

As used herein, the term "Thermoplastic polymer" shall mean a polymer or copolymer that is fusible, softening when exposed to heat and returning generally to its unsoftened state when cooled to room temperature. Thermoplastic materials include for example (but not exclusively), polyvinyl chlorides, some polyesters, polyamides, polyfluorocarbons, polyolefins, some polyurethanes, polystyrenes, polyvinyl alcohol, copolymers of ethylene and at least one vinyl monomer, for example poly(ethylene vinyl acetates), and acrylic resins.

As used herein, the term "Thermoset polymer" shall mean a polymer or copolymer that permanently hardens when heated and/or cross linked.

As used herein, the term "Ultrasonic bonding" shall mean the bonding of fibres and/or filaments using ultrasonic energy. In the field of nonwovens, ultrasonics are normally employed to effect point-bonding of the nonwoven. Typically the equipment employed consists of a rotating engraved metal roll which may be temperature controlled. Mounted above the surface of the roll is an ultrasonic 'horn' which is caused to vibrate at about 20,000 cycles/second or more. A fibrous web is fed between the roll and the ultrasonic horn. The gap between the horn and the roll surface is adjusted such that the web is compressed, particularly in the vicinity of raised regions on the engraved roll surface. Where the vibrating horn makes contact with the web, the fibres and/or filaments in the proximity of the vibrating horn are caused to vibrate relative to each other which in turn generates localised frictional heating of the fibres and/or filaments, which together with the compression of the web results in the thermal bonding of the fibres and/or filaments to each other.

As used herein, the term "Web" shall mean a nonwoven sheet material, usually air permeable, made from fibres and/or filaments. The terms "web" and "fabric" are used herein interchangeably As used herein, the term "Wettable" shall mean that the contact angle of a drop of water on the surface of a sheet material is less than 90 degrees. In practical terms, it is meant that a nonwoven web will be deemed "wettable" if the nonwoven web will spontaneously absorb a drop of water placed on the surface of the nonwoven within about 5 seconds at room temperature.

SUMMARY OF THE INVENTION

The various embodiments of the present invention addresses the needs discussed above by providing an improved high pulp content nonwoven composite fabric and a method to manufacture a such fabric. The composite fabric contains at least about 50 percent, by weight, of pulp fibres. The laminiferous composite fabric comprises three layers each of which is preferably separately and individually formed, and the three layers are thermally or ultrasonically bonded or glued together. The outer layers of the laminate comprise lightweight meltspun nonwoven webs, whilst the middle layer is a sheet material comprising mainly woodpulp fibres with a lesser amount of thermoplastic material(s).

The inventive laminate nonwoven is well suited to the preparation of soft & bulky wipes, in particular wet wipes. The inventive nonwoven confers on wet wipes a particularly advantageous combination of properties, namely good dry and wet softness and wet bulk, good wet abrasion resistance and low wet linting propensity, together with at least 50% by weight natural cellulose fibre, for example woodpulp, content.

The lightweight meltspun nonwoven web material used for the outer layers of a laminate may comprise a spunbond nonwoven, or a meltblown nonwoven. Currently, the lightest basis weight of polypropylene spunbond nonwoven widely commercially available is 12 gsm. In designing a 3-ply laminate nonwoven made with two 12 gsm spunbond outer layers and a middle layer made from a mixture of shortcut fibres, namely woodpulp and about 15% by weight thermoplastic fibre, then by means of a mathematical calculation it can be shown that only 3-ply laminates with a basis weight of at least 58.3 gsm will have an overall woodpulp content of 50% or higher. That is, in this particular product design, a middle layer with a basis weight of at least 34 gsm (of which 85% or about 29 gsm is cellulose) is needed to ensure the overall cellulose content of the composite is 50% or more.

Table A illustrates a number of product design scenarios. The Table shows the minimum composite basis weight needed to make product designs with either (a) 50% or more overall cellulose content, or (b) 65% or more overall cellulose content, when taking into account the basis weight of the outer meltspun layers (5, 8, 10 or 12 gsm), and the non-cellulose binder fibre content of the middle layer (15% or 25%).

TABLE A

PRODUCT DESIGN SCENARIOS

| Basis Weight of each Outer Meltspun Layer (gsm) | Binder Fibre Content of Middle Layer (%) | Minimum Composite Basis Weight (gsm) which contains at least | |
|---|---|---|---|
| | | 50% cellulose | 65% cellulose |
| 12 | 15 | 58.3 | 102.0 |
| 10 | 15 | 48.6 | 85.0 |
| 8 | 15 | 38.9 | 68.0 |
| 5 | 15 | 24.3 | 42.5 |
| 12 | 25 | 72.0 | 180.0 |
| 10 | 25 | 60.0 | 150.0 |
| 8 | 25 | 48.0 | 120.0 |
| 5 | 25 | 30.0 | 75.0 |

In order to produce a laminate composite with 65% or more cellulose in the normal 40 to 65 gsm basis weight range for wiping substrates, the only design meeting this criteria in Table A is the one with two outer layers of 5 gsm meltspun, and a middle layer containing 15% binder fibres.

The use of meltblown webs as the outer layers of the 3-ply product design has a particular advantage in wiping or absorbent article applications. Meltblown webs generally have a relatively small pore size and hence are widely used in filtration applications. The two meltblown webs on the outside of the 3-ply laminate act as a filter to reduce the number of woodpulp fibres or woodpulp fragments being released from the laminate, i.e. the meltblown layers reduce its linting propensity.

Currently the only readily available meltspun nonwovens with a basis weight of less than 10 gsm, preferably 5 gsm or less, are meltblown nonwoven webs made by the conventional meltblown process. At such low basis weights, conventional polypropylene meltblown webs have low physical strength and hence their use in the inventive 3-ply laminate would result in a material with low strength.

Unexpectedly, it has been found that high strength, low basis weight, polypropylene meltblown webs produced by a process that is intermediate between the conventional meltblown and spunbond processes, are particularly suitable for use as the outer layers of the inventive composite nonwoven. High strength meltblown webs of this type, with a basis weight less than 10 gsm are not commercially available at this time. The low basis weight, high strength meltblown webs used in this invention were produced on a pilot line. Surprisingly it was discovered that self supporting, polypropylene, high strength meltblown webs could be produced with a basis weight as low as 3 gsm. Whilst it is possible to make a 3 gsm self-supporting, polypropylene, high strength meltblown web, such a lightweight web is marginal for strength, and a web with a basis weight of about 5 gsm is currently more practical. Development of the equipment, process and/or materials may allow the production of even lower basis weight webs in future When compared to equivalent nonwoven webs made by the conventional meltblown process, the high strength meltblown material is superior in a number of physical properties including tensile and tear strength. For webs of a similar basis weight, the wet tensile strength of the high strength polypropylene meltblown web is about three times greater than that of a conventional polypropylene meltblown web, as shown in Table C. It has been found that when the inventive laminiferous composite nonwoven is made using high strength meltblown webs as the outer layers, the laminate has superior strength and wet abrasion resistance when compared to laminates made with outer layers made from conventional meltblown webs. For similar basis weights, the high strength polypropylene meltblown webs have at least twice the dry tensile strength, MD and CD, of the conventional meltblown webs.

The two outside meltspun layers may be of the same basis weight, or may be of different basis weights. The outer layers may be made by different technologies, for example a high strength meltblown web as one outer layer, and a spunbond web as the second outer layer, an example of which is shown in Table H. The material used to make the meltspun nonwoven may be any melt-spinnable polymer and/or copolymer such as e.g. polypropylene, polyethylene, polyester, or polyamide. The two outer layers may be made of the same material or may be made of different materials. The meltspun filaments comprising the outer layer nonwoven webs may be composed of a single polymer, or may be composed of two different polymers in a bicomponent or biconstituent configuration. In an advantageous embodiment of the invention, the polymer is one derived from sustainable plant-based materials, for example poly(lactic acid).

Meltspun nonwovens made from poly(lactic acid) (PLA) are known, including heatsealable spunbond webs made using bicomponent filaments. An example of the latter is grade 50003C, and 18 gsm heatsealable PLA spunbond nonwoven made by Ahlstrom Chirnside Ltd., Duns, U.K. The heatseal characteristic is given by the production of sheath:core bicomponent spunbond filaments in which the core is formed from a grade of PLA with a melting point of about 165° C., and the sheath is made from a grade of PLA with a melting point of about 130° C. Both PLA grades were supplied by NatureWorks LLC of Blair, Nebr., USA.

In the course of the work leading to this invention, PLA meltblown webs were made on a pilot line by the high strength meltblown process. The meltblown die was of the multiple rows of spinholes design as generally described in U.S. Pat. No. 6,013,223 to Biax-Fiberfilm Corp. The die was 12.5 inches (31.8 cm) wide and comprised multiple individual spinholes arranged in 12 rows, each spinhole being about 0.01 inches (0.25 mm) in diameter. A blend of two PLA resins was used—about 80% by weight of grade 6204, and about 20% by wt of grade 3251, both supplied by NatureWorks LLC. The temperature of the molten resin in the die was about 500° F. (260° C.), and resin throughput was about 105 grams per minute. The PLA meltblown web produced by this process was self-supporting, and could be readily wound into rolls. Several samples of PLA meltblown web were made with a basis weight ranging from about 40 gsm down to about 5 gsm.

Situated between the two outer meltspun layers is a middle layer sheet material formed by either wet forming or airforming or by a coform process, and containing both cellulose fibres and a thermoplastic material. The cellulose fibres may include (but not exclusively) woodpulp, cotton, abaca, sisal, flax and/or jute. In a preferred embodiment the cellulose fibres are woodpulp fibres. In particular, chemically debonded fluff pulp fibres are preferred as the resulting composite nonwoven has good wet & dry bulk, absorbency and softness. The thermoplastic material may be of many forms, non-limiting examples including thermoplastic fibres or filaments, synthetic woodpulp (SWP), thermoplastic films, thermoplastic powders, pellets, flakes or granules, and/or as a dispersion in a liquid. The middle layer sheet material may contain one or more types of thermoplastic material. The thermoplastic material may be made from the same or similar polymers and/or copolymers as used to make the meltspun webs used for the outer layers. It is preferable that the thermoplastic material be compatible with the meltspun outer layers to ensure good thermal bonding between the plies. In a preferred embodiment the thermoplastic material(s) comprise thermoplastic filaments or fibre(s). In those embodiments where the thermoplastic material comprises fibres or filaments, these can be of a monocomponent or a bicomponent configuration. Non-limiting examples of bicomponent sheath:core binder fibres include PE sheath:PET core, or PE sheath:PP core, or PP sheath:PET core. Where the middle layer is formed by an airforming process, the thermoplastic fibres or filaments may be straight or crimped, have a fineness between 0.1 and 20 denier, and are generally less than about 10 mm in length. Where the middle layer is formed by a wetlaying process, the thermoplastic fibres or filaments may be straight or crimped, have a fineness between 0.1 and 20 denier, and are generally less than about 20 mm in length. Where the middle layer is formed by a coform process, the thermoplastic filaments typically have a diameter less than 10 microns, and have a length generally greater than 10 cm. The middle layer sheet material may contain one or more types of thermoplastic fibre or filament. In addition to fibrous materials, other non-fibrous materials may be added to the middle layer sheet material, most particularly in the case of an airformed or coform sheet material. These other materials include powders, granules, flakes, beads, seeds or other particulates, non-limiting examples of which include superabsorbent polymers (including, but not exclusively, polymers made using acrylic, alginate, and/or carboxymethylcellulose chemistries), activated carbon, encapsulated beads containing materials such as perfumes or essential oils, abrasive particulates, bleach powder, anti-microbial agents, soap flakes, detergent flakes or granules, and the like. Those skilled in the art will recognize that there are numerous other non-fibrous materials which can be optionally included in the middle layer sheet material.

The structure of the middle layer sheet material may be either a substantially homogeneous blend of woodpulp and thermoplastic material(s) and other additives, or may be a layered or stratified structure where one or more component(s), for example the thermoplastic material(s), is more concentrated close to the upper and/or lower surface of the middle layer sheet.

Optionally the middle layer sheet material may be patterned. There are several patterning techniques which may be employed, non-limiting examples of which include hot or cold embossing, printing, pin-perforation, and techniques which cause relative thin and thick regions to be formed in the sheet. Non-limiting examples of the latter, particularly applicable to wet formed sheet materials, are described in U.S. Pat. No. 4,666,390 and GB 1,102,246. One advantage of using a patterned sheet with relatively thin and thick regions is that it is possible, with proper registration, to thermally or ultrasonically bond the two external spunmelt layers through the relatively thin regions of the middle layer, particularly when using a complementary point-bond pattern.

The three layers of the composite are advantageously formed separately and individually, and then brought together and collated prior to bonding. The three layers may be thermally bonded together using a calender with two heated rolls. The heated calender may comprise a plain steel anvil roll and a roll engraved with a point-bond pattern, i.e. a pin to anvil point-bonding. Alternatively, the heated calender may comprise two steel rolls engraved with the same point-bond pattern, and which rotate with the patterns matched and in register, i.e. a pin to pin point-bonding. Alternatively, the heated calender may comprise two steel rolls engraved with mating male & female patterns for the purpose of male-female embossing. Alternatively, the three layers may be ultrasonically bonded together using a point-bond pattern. By the use of a particular embossing pattern(s), such as those shown in FIG. 11, it is possible to create a soft, so-called "pillow effect" which visually accentuates the bulk of the product. Alternatively the three layers may be adhesively bonded together, for example, by using a hot melt adhesive.

It will be noted that in this product design and manufacturing method there is a well-defined interface between each of the layers, with little fibre mixing between the layers. Thus the boundary between any two adjacent nonwoven layers is distinct in that fibres at or near the surfaces of such adjacent layers are not significantly intermingled.

In a preferred embodiment where the two outside layers of the composite comprise a nonwoven web made from high strength meltblown filaments, the use of this web material confers particular advantages to the composite fabric. Due to its relatively small average pore size, the meltblown web acts as a filter or barrier to the fibres of the middle layer sheet material, reducing the propensity of the composite nonwoven to lint. The process by which the high strength meltblown filaments are formed produces a higher strength nonwoven web material (as shown in Table C). The use of 5 gsm high strength polypropylene meltblown webs as the two outer layers of the inventive laminate, produces a composite nonwoven with significantly better wet and dry tensile strength, better tear strength, and higher Mullen burst strength (comparison shown in Table G), and which are comparable for these properties with other high woodpulp content wiping substrates such as airlaid, multi-bond airlaid and coform nonwovens (comparison shown in Table I). Conversely, if the inventive laminate were made using two outer layers of 5 gsm conventional polypropylene meltblown web, it would have insufficient strength to function effectively as a wipe.

In a preferred embodiment the present invention contemplates the outer layers each being a meltspun nonwoven web of about 5 gsm or less, the middle layer sheet material being an airformed nonwoven web comprising a blend of debonded fluff pulp and thermoplastic fibres, and the three layers are bonded together by thermal or ultrasonic point-bonding. This preferred embodiment gives a soft nonwoven composite fabric with properties well suited for use as a number of consumer products including wet wipes, in particular with the advantageous combination of high wet bulk, good wet abrasion resistance and low linting. In one advantageous embodiment, the nonwoven composite fabric has a dry basis weight between 40 gsm and 65 gsm.

The present invention also contemplates treating the nonwoven composite fabric with small amounts of materials such as, but not exclusively, surfactants, hydrating agents, antistatic agents, lubricants and/or pigments to give additional or different functionality. Such treatments may be applied either to the webs comprising the individual layers, and/or to the bonded laminate fabric. In the case of the meltspun outer layers, these materials may be added as melt additive(s) to the molten polymer before filament production, and/or the materials made be added as a topical treatment to the spun filaments or web.

The middle layer and the outer layers are thermally, ultrasonically or by glueing bonded together to form a high cellulose content composite nonwoven. Thermal and ultrasonic bonding require that in each of the layers that are bonded together, that there be present some thermoplastic fibres having a similar softening and/or melting temperature, and which are compatible in the sense that when thermally fused together, they form a reasonably strong bond. Such thermoplastic fibres when at least partially melted in a thermal and ultrasonic bonding process allow the middle layer and the outer layers to be joined together. When using a glue to bond the layers together, it is not necessary to have thermoplastic fibres in each of the layers to be joined together.

The middle nonwoven layer and the outer nonwoven layers are first formed separately and individually to be self-supporting webs, whereafter the three self-supporting webs are brought together essentially immediately before bonding them together to form the high cellulose content composite nonwoven. When these three separately manufactured, self-supporting layers are bonded, by thermal, ultrasonic bonding or by glueing, the boundary between any two adjacent nonwoven layers is distinct in that fibres at or near the surfaces of such adjacent layers are not significantly intermingled.

In recent years there has been growing focus on raw materials derived from renewable and/or sustainable sources. Cellulose fibres such as woodpulp, cotton, abaca, sisal, flax, jute and the like, have long been used in the manufacture of paper and paper like products. Such fibres have the further advantage of being biodegradable and compostable. Most woodpulp today is produced from wood sourced from managed forests, with new trees being planted to replace those harvested. As such, woodpulp meets the requirements of being sustainable and renewable. Other research has yielded polymer materials derived from plant materials. For example poly (3-hydroxybutyrate) (PHB) and poly(lactic acid) (PLA), both of which can be made from plant sugar or starch. Advantageously each first, second and third layer comprise the same melt-spinnable, sustainable and renewable material, derived from plant materials, such as e.g. poly(3-hydroxybutyrate) (PHB) or poly(lactic acid) (PLA). Such a composition can be bonded e.g. thermally to form a renewable and/or sustainable nonwoven fabric.

BRIEF DESCRIPTION OF THE DRAWINGS AND FIGURES

The invention will be more easily understood by a detailed explanation of the invention including drawings. Accordingly drawings which assist in explaining the invention are attached herewith. It should be understood that such drawings are intended to aid the explanation only, and are not necessarily to scale. The drawings are briefly described as follows.

DETAILED DESCRIPTION OF THE INVENTION

Reference will now be made in detail to preferred embodiments of the invention, examples of which are illustrated in the following Examples section. For the sake of simplicity and clarity, it is assumed in the following text that the melt-spun webs comprising the outer layers are made from polypropylene. This does not preclude the use of meltspun webs made from other materials being used to produce the inventive laminate.

To achieve the object of the invention of providing an improved, high woodpulp content, nonwoven substrate to be used in the manufacture of soft wiping materials, the present inventors have made the discovery that the use of a lightweight, high strength, meltblown nonwoven web as the outer layers of a laminate web structure unexpectedly gives a nonwoven wiping material with several advantageous properties and combinations thereof, including good wet bulk, good wet abrasion resistance and with a low propensity for linting.

Figure 1:
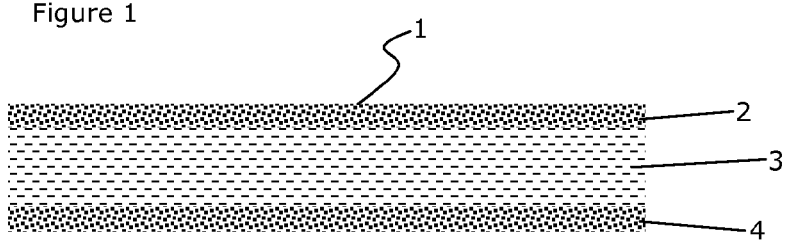
FIG. 1 is a diagrammatic cross sectional view of the inventive laminiferous fabric before point bonding.

FIG. 1 shows a diagrammatic cross-section of the inventive laminiferous composite nonwoven fabric 1 before point bonding. Nonwoven fabric 1 is made from three precursor layers. The two outside layers, the second layer 2 and the third layer 4 comprise lightweight, high strength, meltblown nonwoven webs. Web 2 may or may not be of the same basis weight and/or composition as web 4. The first layer 3, which is the middle layer comprises a sheet material made from woodpulp fibres and thermoplastic fibres or filaments and optionally other materials such as particulates. The thermoplastic fibres or filaments may form up to 40% w/w of the middle layer sheet material. The three layers 2, 3 and 4 are each formed separately and individually, and then brought together and collated before bonding together to form the composite nonwoven 1. The inventive composite nonwoven fabric 1 contains at least 50% w/w cellulose, for example woodpulp fibres, preferably more than 65% w/w and has a dry basis weight of less than 200 gsm, preferably less than 100 gsm, and advantageously between 40 to 65 gsm.

The requirement for the two nonwoven outer layers 2 and 4 is that they comprise essentially melt-spinnable fibres.

Figure 11:
FIG. 11 is a photograph of the inventive laminate after embossing with an alternate embossing pattern. The rule in the photograph lies in the cross-direction, showing both millimeter and inch based scales.

The three layers of the inventive laminiferous composite nonwoven fabric may be bonded together by either adhesive bonding, or by using either ultrasonic bonding or thermal bonding, both latter processes using preferably at least one calender. The thermal energy imparted to the web by the latter techniques bonds together the layers by means of the thermoplastic material contained in each layer. In a preferred embodiment, a point-bond pattern is used, either in connection with ultrasonic bonding, or with thermal bonding. As the point-bonding technique creates bonding between the layers in localised areas only, the bonded laminate retains a high degree of softness, flexibility, drape and bulk, whilst the bonding between the layers is adequate for its intended application as a substrate from which wet and/or dry wipes are made. In an advantageous embodiment, the embossing pattern is chosen to create a pillow effect as illustrated in FIG. 11.

Figure 2:
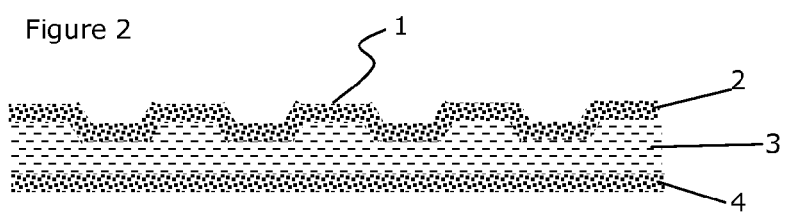
FIG. 2 is a diagrammatic cross sectional view of the inventive laminiferous fabric after pin-to-anvil point bonding.

FIG. 2 shows a diagrammatic cross-section of the inventive laminiferous composite nonwoven fabric 1 after pin-to-anvil point bonding, either utilising ultrasonic or thermal energy. Layer 2 which was in contact with the steel roll engraved with the point-bond pattern shows an emboss pattern, whereas layer 4 which was in contact with the smooth anvil roll remains essentially planar. The middle layer 3 is compacted in localised areas by the point bond pattern roll. In between the bond points, layer 3 is little compacted.

Figure 3:
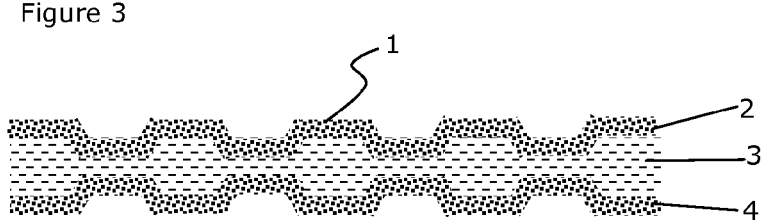
FIG. 3 is a diagrammatic cross sectional view of the inventive laminiferous fabric after pin-to-pin point bonding.

FIG. 3 shows a diagrammatic cross-section of the inventive laminiferous composite nonwoven fabric 1 after pin-to-pin point bonding. Layers 2 and 4 both show an emboss pattern due to the point-bond pattern engraved on both rolls. As the point-bond pattern on both rolls is identical, and the two rolls rotate with the patterns matched and in register, the emboss patterns imparted to outer layers 2 and 4 are mirror images of each other. The middle layer 3 is compacted in localised areas by the point bond pattern rolls. In between the bond points, layer 3 is little compacted.

Figure 4:
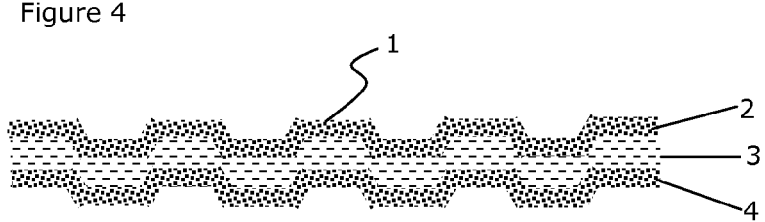
FIG. 4 is a diagrammatic cross sectional view of the inventive laminiferous fabric after embossing with male-female pattern engraved rollers.

In another embodiment, the three layers of the inventive laminiferous composite nonwoven may be bonded together using a calender equipped with heated male and female pattern engraved embossing rolls. FIG. 4 shows a diagrammatic cross-section of the inventive composite nonwoven fabric 1 after embossing with male-female pattern heated rollers. Outer layers 2 and 4 both show an emboss pattern due to the matched and complementary male and female patterns engraved on the two calender rolls.

Figure 5:
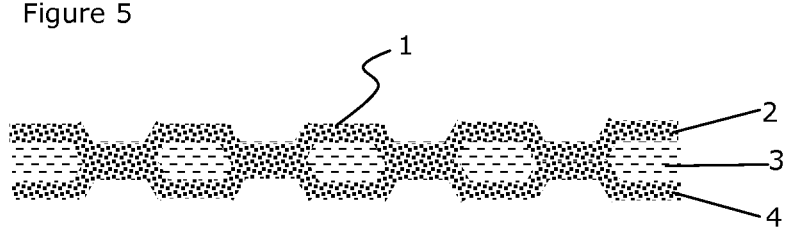
FIG. 5 is a diagrammatic cross sectional view of the inventive laminiferous fabric after pin-to-pin point bonding using a middle layer with thin and thick regions, and where the point bonding of the laminate takes place predominantly through the thin regions of the middle layer.

FIG. 5 shows a diagrammatic cross-section of the inventive laminiferous composite nonwoven fabric 1 after pin-to-pin point bonding, but using a middle layer sheet material 3 which has thin and thick regions, and where the point bonding of the three layers 2, 3 and 4 takes place predominantly through the thin regions of the middle layer 3. Alternatively using the same concept of employing a middle layer sheet material which has thin and thick regions, a 3-ply laminate material can be made using pin-to-anvil point bonding.

It will be noted that in FIGS. 2, 3, 4 and 5 at least one outer surface of the composite fabric is non-planar, that is, it has surface features giving it a textured surface. When such a nonwoven is converted into a wipe, the textured surface(s) assists in the cleaning process by helping remove stubborn dirt, and assist in the collection and removal of surface debris such as crumbs, hairs, fibres, and/or other particulate matter.

Figure 6:
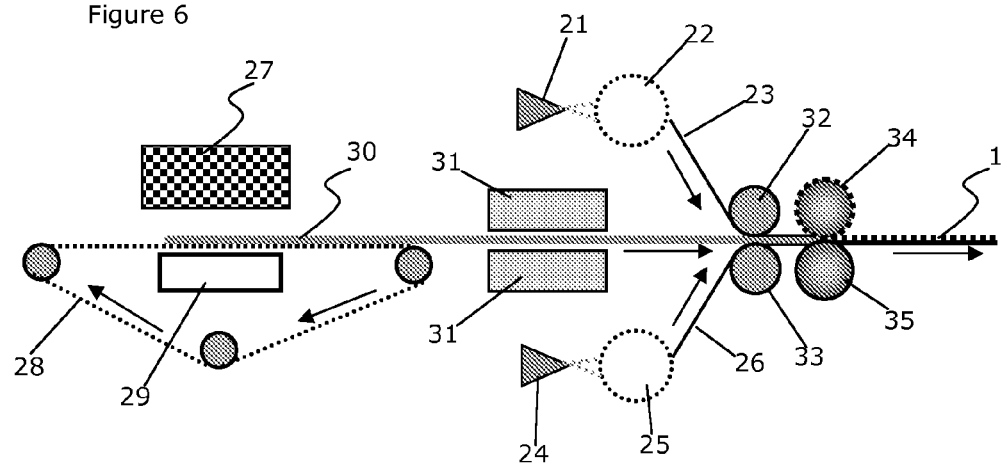
FIG. 6 shows a diagrammatic side elevation view of a first preferred embodiment for making the inventive fabric.
Figure 8:
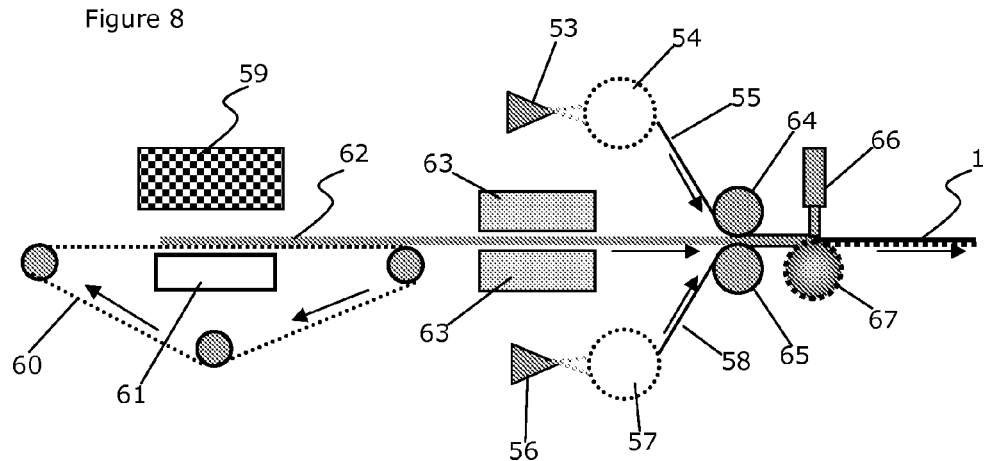
FIG. 8 shows a diagrammatic side elevation view of a third preferred embodiment for making the inventive fabric.

FIG. 6 illustrates a first preferred process for making the inventive laminiferous composite nonwoven fabric, in which the middle layer sheet material is made by an airforming process. The first self-supporting meltspun web 23 is produced using a meltblown die 21 and a rotating vacuum collection drum 22. A second self-supporting meltspun web 26 is produced using a meltblown die 24 and a rotating vacuum collection drum 25. For each meltspun web 23 and 26, by adjusting the combination of resin throughput and the circumferential speed of the collection drum, a meltspun web of the desired basis weight is obtained. Alternatively, one or both of the meltspun webs may be replaced by a pre-made web, for example a spunbond web, which is unwound from a roll mounted on an unwind stand. The middle layer sheet material web 30 is formed by means of one or more airforming heads 27 which is fed with a controlled ratio of fiberised fluff woodpulp and man-made fibres. One or more vacuum boxes 29 are located within a moving, endless, foraminous, collection surface 28. The vacuum box(es) is located directly below the airformer 27. The vacuum box(es) creates an airstream which draws the fibres deposited by the airformer 27 down on to the moving collection surface. By adjusting the fibre throughput of the airforming head(s) 27 and the linear speed of the collection surface 28, a middle layer sheet material 30 of the desired basis weight can be obtained. The sheet material 30 passes through a heating element 31, for example (but not exclusively) a hot air oven, where the airlaid web is heated. The heating element 31 may also be used to fuse some or all of the thermoplastic fibres contained in the sheet material to neighbouring fibres. The webs comprising the three layers 23, 26 and 30 are then brought together and collated between rolls 32 and 33, before passing into the nip of a thermal calender where the three layers are bonded together. The gap between the collation rolls 32 and 33 is adjustable to suit the thickness of the laminiferous composite structure. FIG. 6 illustrates a thermal calender comprising an engraved point-bond roll 34 together with a plain anvil roll 35, producing a thermally point-bonded nonwoven fabric 1. Alternatively, calender rolls 34 and 35 may be engraved with complementary male and female embossing patterns, or may both be engraved with the same matched point bond pattern to allow pin-to-pin embossing. Alternatively the three layers may be bonded together using an ultrasonic bonding device as illustrated in FIG. 8. After bonding, the laminate fabric 1 may be wound up or otherwise processed.

Figure 7:
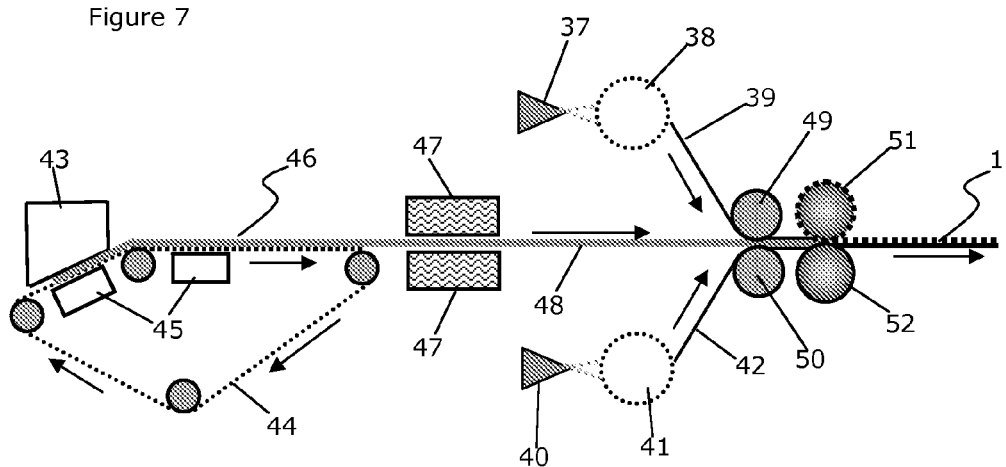
FIG. 7 shows a diagrammatic side elevation view of a second preferred embodiment for making the inventive fabric.

FIG. 7 illustrates a second preferred process for making the inventive laminiferous composite nonwoven fabric, in which the middle layer sheet material is made by a wet forming process. The self-supporting meltspun web layers 39 and 42 are made as previously described for FIG. 6. Alternatively, one or both of the meltspun webs may be replaced by a pre-made nonwoven web, for example a spunbond web, which is unwound from a roll mounted on an unwind stand. The middle layer sheet material 48 is made by a wet forming process. Either conventional papermaking equipment can be used, or as FIG. 7 illustrates, an inclined wet former can be used. The latter is preferred if processing a blend of woodpulp and man-made fibres, as in the present invention, because a more dilute fibre suspension may be used, thereby allowing better sheet formation particularly when using longer man-made fibres. A dilute dispersion of the fibre blend in water is supplied to the headbox 43, which applies the fibre in water suspension to a moving, foraminous surface 44 where a wet fibrous sheet 46 is formed on top of the foraminous surface. Vacuum boxes 45 situated below the foraminous surface are used to collect and remove water from the fibre in water suspension applied to the foraminous surface. The vacuum boxes 45 also help reduce the amount of residual water in the wet sheet 46. Optionally a machine with two or three headboxes can be used. Having multiple headboxes present allows fibre suspensions with different fibre blends, for example different woodpulp to thermoplastic fibre ratio, to be supplied to each headbox, allowing a stratified or layered sheet structure to be formed, for example, with a higher percentage of thermoplastic fibres located near to the top and/or bottom surfaces of the wetlaid sheet. The web is dried by means of a heating element 47, which may include any conventional equipment such as oil or steam heated drier cans, through air driers, hot air ovens, hot air impingement drier, infra-red driers and the like. The heating element 47 may also be used to fuse some or all of the thermoplastic fibres contained in the sheet material to neighbouring fibres. The dried web 48 and meltspun web layers 39 and 42 are then brought together and collated between rolls 49 and 50, before passing into the nip of a thermal calender where the three layers are bonded together to form the composite nonwoven 1. The gap between the collation rolls 49 and 50 is adjustable to suit the thickness of the laminiferous composite structure. FIG. 7 illustrates a thermal calender comprising an engraved point-bond roll 51 together with a plain anvil roll 52, producing a thermally point-bonded nonwoven fabric 1. Alternatively, calender rolls 51 and 52 may be engraved with complementary male and female embossing patterns, or may both be engraved with the same matched point bond pattern to allow pin-to-pin embossing. Alternatively the three layers may be bonded together using an ultrasonic bonding device. After bonding, the laminate fabric 1 may be wound up or otherwise processed.

FIG. 8 illustrates a third preferred process for making the inventive laminiferous composite nonwoven fabric, in which the middle layer sheet material is made by an air forming process. The illustrated process is similar to that shown and described in FIG. 6, except that the bonding together of the three plies is accomplished using an ultrasonic bonding process. FIG. 8 illustrates that the outer layers 55 and 58 of the laminiferous composite are self-supporting, meltspun webs produced as previously described for FIG. 6. Alternatively, one or both of the meltspun webs may be replaced by a pre-made nonwoven web, for example a spunbond web, which is unwound from a roll mounted on an unwind stand. An ultrasonic horn 66 is mounted in close proximity to a rotating engraved calender roll 67. After collation of the three plies between collating rolls 64 and 65, the laminiferous composite is ultrasonically bonded as it passes between the ultrasonic horn 66, and the engraved roll 67.

Figure 9:
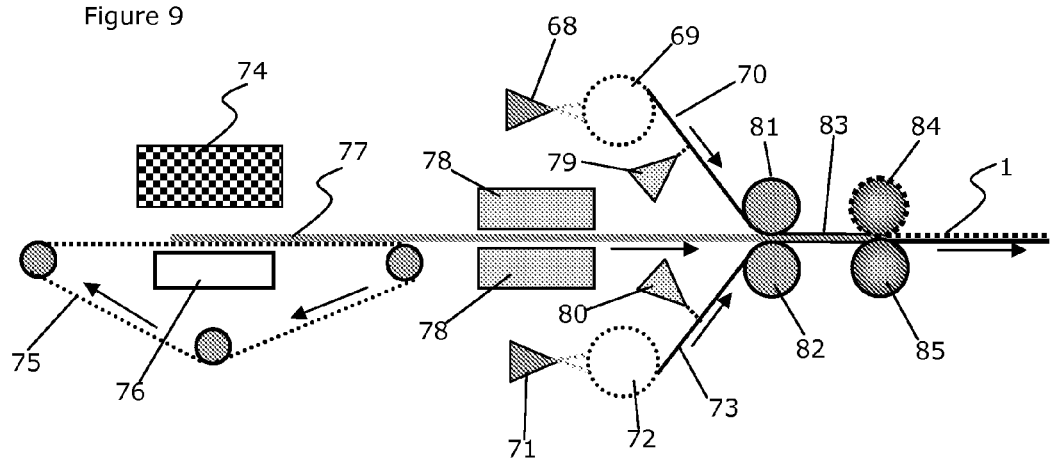
FIG. 9 shows a diagrammatic side elevation view of a fourth preferred embodiment for making the inventive fabric.

FIG. 9 illustrates a fourth preferred process for making the inventive laminiferous composite nonwoven fabric, in which the middle layer sheet material is made by an air forming process. The illustrated process is similar to that shown and described in FIG. 6, except that the bonding together of the three plies is accomplished using an adhesive. When considering adhesive bonding, there are many techniques possible. FIG. 9 illustrates one technique using a hot melt adhesive. Those skilled in the art will recognise how other adhesive bonding techniques may be employed. FIG. 9 illustrates that the outer layers 70 and 73 of the laminiferous composite are self-supporting, meltspun webs produced as previously described for FIG. 6. Alternatively, one or both of the meltspun webs may be replaced by a pre-made nonwoven web, for example a spunbond web, which is unwound from a roll mounted on an unwind stand. The binder fibres contained in the airformed web 77 are activated by heating the web in the heating element 78 to create a self-supporting web. Using a hot melt adhesive applicator 79, a small quantity (less than 10 gsm, preferably less than 5 gsm) of hot melt adhesive is applied to one side of web 70 such that the hot melt adhesive will also contact a surface of the middle layer web 77 when the three layers are collated. Similarly, using a hot melt adhesive applicator 80, a small quantity (less than 10 gsm, preferably less than 5 gsm) of hot melt adhesive is applied to one side of web 73 such that the hot melt adhesive will also contact a surface of the middle layer web 77 when the three layers are collated. Webs 70 and 73 are collated with the airlaid web 77 between two collating rolls 81 and 82, the gap between these rolls being adjustable. The resulting laminate web 83 is a non-embossed, flat sheet structure. If embossing is desired, the non-embossed web 83 is then passed through the nip of two rolls of an embossing calender which optionally may be heated. FIG. 9 illustrates an embossing calender comprising an engraved roll 84 together with a plain anvil roll 85, producing an embossed nonwoven fabric 1. Alternatively, calender rolls 84 and 85 may be engraved with complementary male and female embossing patterns, or may both be engraved with the same matched point bond pattern to allow pin-to-pin embossing. Alternatively the laminiferous composite nonwoven may be patterned using an ultrasonic patterning device. After bonding, the laminate fabric 1 may be wound up or otherwise processed.

The following paragraphs give a detailed description of the production and characteristics of the three precursor layers.

High Strength Meltblown Web

The meltblown filaments which form the high strength meltblown web are produced using a meltblown die which comprises a plurality of filament spinning nozzles arranged in multiple rows as described in U.S. Pat. No. 6,013,223. The selected raw material is fed in a controlled manner to a heated screw extruder, which melts and mixes the polymer. The molten polymer is then metered into the meltblown die body under pressure using one or more volumetric gear pumps. If required, melt additive(s) can be mixed with the polymer resin prior to melting and mixing inside the heated screw extruder. Molten polymer is extruded through the multiple spinning nozzles to form polymer streams which are attenuated into filaments by being accelerated by hot air flowing at high speed in a direction essentially parallel to the spinning nozzles. The filaments are simultaneously accelerated and cooled below their melting point by the high speed air flow (also known as attenuation air). The resulting filaments are at least partially drawn and have a degree of molecular orientation and tenacity. U.S. Pat. No. 6,013,223 describes the use of a draw jet to further attenuate the filaments. However in making the meltblown webs used in this invention, the use of a draw jet was not found to be necessary. The filaments are collected on a moving foraminous surface, which in FIG. 6 is shown as a rotating cylinder 22 which is covered with an endless foraminous surface. Alternatively, the filaments may be collected on a moving, flat foraminous surface. The rotating cylinder has one or more vacuum boxes contained within its structure. The vacuum thus created helps draw the meltblown filaments on to the foraminous surface of the cylinder, where the meltblown filaments form a self-supporting web without any additional treatment, bonding, or other intervention. The formation of a self-supporting nonwoven web is believed to be due at least in part to self entangling on the meltblown filaments on the collection surface combined with residual heat in the filaments. Self-supporting, polypropylene meltblown webs with a basis weight as low as 3 gsm have been made by this method.

As shown in FIG. 6, a second meltblown web 26 is produced using a second meltblown die 24 and a second collection drum 25 in a similar fashion to that described above. In the present invention, the second meltblown web 26 may or may not be of the same basis weight, and may or may not be of the same composition as first meltblown web 23.

Alternatively, one or both meltblown webs may be replaced with a different type of nonwoven, for example, a conventional meltblown web, or a spunbond web. In this case, the alternate nonwoven is supplied as a roll of pre-made fabric which is unwound, collated with the other layers, and then all the layers are thermally or ultrasonically bonded together.

In the inventive laminiferous composite nonwoven, the meltblown filaments may be composed of a single resin, or may be composed of two resins in the form of bicomponent filaments. The cross-section of a bicomponent filament may include configurations such as sheath-core (central or offset core), side-by-side, multi-segment pie, and other configurations known to those skilled in the art.

The production of high strength meltblown filaments varies from the production of conventional meltblown filaments in a number of ways. To illustrate the differences, polypropylene (PP) meltblown will be used as an example.

Raw Materials

Conventional PP meltblown filaments are produced by extruding a relatively low viscosity, molten polymer through the spinning nozzles. A low viscosity polymer melt is produced by (a) selecting a grade of PP resin with a high melt flow rate (MFR), examples of which are grade PP3746G available from ExxonMobil which has a MFR of about 1475 grams/10 minutes at 230° C., and grade Metocene MF650Y available from LyondellBasell which has a MFR of about 1800 grams/10 minutes at 230° C.; and (b) maintaining the molten polymer at a high temperature prior to filament spinning, typically about 240-250° C. in order to further reduce the viscosity of the molten polymer. In order to achieve such high melt flow rates, peroxide compounds may be added to the PP resin. When the polymer and peroxide are melted together, the peroxide forms free radicals which interact with and bring about scission of the polypropylene polymer chains, thereby reducing the average molecular weight of the resin. The reduction in resin molecular weight brings about a reduction in the tenacity of the filaments formed in the melt-spinning process. When meltblown filaments are used to form filter media, especially when used as part of a SMS composite, this reduction in filament strength is relatively unimportant as the main function of the meltblown filaments is to form a filtration layer. However in the present invention, the strength of the meltblown filaments, and the strength of the nonwoven web they form, is important for a wiping application.

By way of contrast, in the spunbond process the objective is to produce high tenacity filaments which, after bonding, form a high strength nonwoven web. The polypropylene resin used to make spunbond filaments has a lower melt flow rate, typically about 35 grams/10 minutes at 230° C. (commonly referred to as 35 MFR). One such resin is grade PP3155 available from ExxonMobil. Peroxides are generally not added to these resins. To minimise thermal degradation of the resin during processing, the molten polymer is maintained at a lower temperature prior to filament spinning, typically about 230° C. The combination of higher molecular weight PP resin, less thermal degradation during the filament spinning process, and effective filament attenuation after spinning allows high strength spunbond filaments to be formed.

Process Conditions

High strength meltblown filaments are produced by a process that is intermediate between (or a hybrid of) the spunbond process and the conventional meltblown process. A typical polypropylene spunbond resin (35 MFR) may be used to make the high strength meltblown filaments. During filament spinning the molten polymer temperature is about 285 to 290° C. These factors result in a molten polymer inside the meltblown die with a much higher viscosity versus the molten polymer in the conventional melt blowing process. In order to achieve a sufficient throughput of the high viscosity molten polymer, it is necessary to pressurise the molten polymer in the die at pressures up to 1200 psi (8274 kPa). This pressure is much higher than used in the conventional meltblowing process, and exceeds the pressure handling capability of a conventional meltblown die, but is within the pressure handling capability of the meltblown die described in U.S. Pat. No. 6,013,223 due to its different design and construction.

Table B shows a comparison of the materials and typical process conditions used to make conventional polypropylene meltblown, polypropylene spunbond, and high strength polypropylene meltblown filaments.

TABLE B

TYPICAL PROCESSING CONDITIONS

| Process: | Conventional meltblown | Spunbond | High Strength meltblown |
|---|---|---|---|
| Raw material | PP resin | PP resin | PP resin |
| Resin melt flow index at 230° C. (g/10 mins) | 1800 | 35 | 35 |
| Polymer melt temperature in die (deg C.) | 240-250 | 230 | 285-290 |

TABLE B-continued

TYPICAL PROCESSING CONDITIONS

| Process: | Conventional meltblown | Spunbond | High Strength meltblown |
|---|---|---|---|
| Polymer melt pressure in die (psi) | 40-50 | 1000-1500 | 1000-1200 |
| Attenuation air temperature (deg C.) | 250 | ambient | 225 |

Table C shows a comparison of the properties of polypropylene nonwoven webs made by the conventional meltblown process, and by the high strength meltblown process.

TABLE C

COMPARISON OF PROPERTIES OF CONVENTIONAL vs HIGH STRENGTH MELTBLOWN WEBS

|  | Conventional meltblown Ex. A | Conventional meltblown Ex. B | Conventional meltblown Ex. C | High Strength meltblown EX. D | High Strength meltblown Ex. E | High Strength meltblown Ex. F |
|---|---|---|---|---|---|---|
| Basis Weight (gsm) | 4.65 | 6.07 | 11.10 | 4.83 | 5.32 | 7.70 |
| Dry Tensile Strength, MD (N/m) | 26.5 | 27.8 | 55.2 | 65.3 | 80.3 | 102.3 |
| Dry Tensile Strength, CD (N/m) | 8.5 | 7.5 | 22.3 | 35.0 | 31.0 | 55.8 |
| Dry T.S. geometric mean (N/m) | 15.0 | 14.4 | 35.1 | 47.8 | 49.9 | 75.6 |
| Dry Tensile Elongation, MD (%) | 6 | 6 | 2 | 39 | 51 | 91 |
| Dry Tensile Elongation, CD (%) | 12 | 6 | 3 | 106 | 109 | 96 |
| Dry Toughness, MD (J) | 0.003 | 0.003 | 0.002 | 0.063 | 0.099 | 0.246 |
| Dry Toughness, CD (J) | 0.001 | 0.037 | 0.002 | 0.087 | 0.078 | 0.128 |
| Wet Tensile Strength, MD (N/m) | 25.8 | 30.5 | 58.8 | 80.2 | 77.5 | 112.5 |
| Wet Tensile Strength, CD (N/m) | 9.0 | 9.8 | 26.8 | 38.8 | 36.0 | 64.5 |
| Wet T.S. geometric mean (N/m) | 15.2 | 17.3 | 39.7 | 55.8 | 52.8 | 85.2 |
| Wet T.S. geometric mean index (N/m per gsm) | 3.3 | 2.8 | 3.6 | 11.5 | 9.9 | 11.1 |
| Wet Tensile Elongation, MD (%) | 4 | 6 | 2 | 49 | 36 | 84 |
| Wet Tensile Elongation, CD (%) | 7 | 6 | 3 | 117 | 95 | 109 |
| Wet Toughness, MD (J) | 0.002 | 0.003 | 0.002 | 0.102 | 0.069 | 0.231 |
| Wet Toughness, CD (J) | 0.001 | 0.001 | 0.001 | 0.107 | 0.080 | 0.169 |
| Dry Elmendorf Tear, MD (mN) | 160 | 160 | 200 | 440 | 520 | 640 |
| Wet Elmendorf Tear, MD (mN) | 160 | 160 | 160 | 600 | 760 | 720 |
| Wet Thickness (microns) | 96 | 88 | 142 | 82 | 101 | 129 |
| Wet Bulk (cc/g) | 20.7 | 14.5 | 12.8 | 16.9 | 18.9 | 16.7 |
| Air permeability (l/min/dcm) | 4598 | 3235 | 1750 | 2128 | 2088 | 1188 |
| Average filament diameter (microns) |  |  | 5.35 |  |  | 3.56 |
| Average pore size (microns) |  |  | 46 |  |  | 27 |

For about similar basis weights, the high strength polypropylene meltblown webs have a geometric mean dry tensile strength as least twice that of the conventional meltblown webs. The geometric mean wet tensile strength index is about three times that of the conventional meltblown webs of a similar basis weight. Wet and dry MD and CD toughness, and wet and dry MD tear strength are all substantially improved in the case of the high strength meltblown webs. Wet thickness and bulk are broadly similar for both types of meltblown web. The average filament diameter of the high strength meltblown web is lower than that of the conventional meltblown web, which is also reflected in the relative air permeabilities. Note that due to the very light basis weight of these meltblown webs, the abrasion resistance of the individual webs could not be measured. However once 3-ply laminates are formed from these meltblown webs, the abrasion resistance of the laminate can be readily measured.

Meltblown webs may be subjected to additional bonding by a number of techniques, of which thermal bonding is the most common. Thermal point-bonding is widely used to create strong nonwoven webs from spunbond filaments. To evaluate the change in web properties after point bonding, sample rolls of high strength PP meltblown web was subjected to thermal point-bonding using a 2 roll calender using the conditions shown below, Point-bond pattern on engraved steel roll: diamond shaped bond points arranged in a regular geometric pattern, 18% bond area. Anvil roll: plain steel roll Roll surface temperature: engraved roll 103° C., anvil roll 105° C. (measured using a surface contact temperature probe)

Pressure loading on rolls: 200 pounds per linear inch (35.8 kg per linear cm)

Web speed: 100 feet/minute (30.5 meters/minute)

Table D shows a comparison of the properties of high strength polypropylene meltblown webs before and after point-bonding.

TABLE D

EFFECT OF POINT-BONDING

|  | Ex. D | Ex. E | Ex. G | Ex. H |
|---|---|---|---|---|
| Point-bonded? | No | No | Yes | Yes |
| Basis Weight (gsm) | 4.83 | 5.32 | 4.01 | 4.34 |
| Dry Tensile Strength, MD (N/m) | 65.3 | 80.3 | 100.3 | 100.3 |
| Dry Tensile Strength, CD (N/m) | 35.0 | 31.0 | 24.3 | 32 |
| Dry T.S. geometric mean (N/m) | 47.8 | 49.9 | 49.4 | 56.7 |
| Dry Tensile Elongation, MD (%) | 39 | 51 | 21 | 22 |
| Dry Tensile Elongation, CD (%) | 106 | 109 | 74 | 68 |
| Dry Toughness, MD (J) | 0.063 | 0.099 | 0.043 | 0.043 |
| Dry Toughness, CD (J) | 0.087 | 0.078 | 0.037 | 0.046 |
| Wet Tensile Strength, MD (N/m) | 80.2 | 77.5 | 105.0 | 94.0 |
| Wet Tensile Strength, CD (N/m) | 38.8 | 36.0 | 29.8 | 29.5 |
| Wet T.S. geometric mean (N/m) | 55.8 | 52.8 | 55.9 | 52.7 |
| Wet Tensile Elongation, MD (%) | 49 | 36 | 21 | 12 |
| Wet Tensile Elongation, CD (%) | 117 | 95 | 65 | 66 |
| Wet Toughness, MD (J) | 0.102 | 0.069 | 0.046 | 0.021 |
| Wet Toughness, CD (J) | 0.107 | 0.080 | 0.041 | 0.041 |
| Dry Elmendorf Tear, MD (mN) | 440 | 520 | 48 | 23 |
| Wet Elmendorf Tear, MD (mN) | 600 | 760 | 28 | 45 |
| Wet Thickness (microns) | 82 | 101 | 79 | 90 |
| Wet Bulk (cc/g) | 16.9 | 18.9 | 19.6 | 20.7 |

It will be noted that whilst thermal point-bonding increased MD dry and wet tensile strength, the other properties tested were either inferior after point-bonding, or else little changed. Hence with little property enhancement to be gained by point-bonding the high strength meltblown web, all subsequent production of the inventive laminate nonwoven was carried out using high strength meltblown webs which were not subject to any deliberate bonding process prior to the final collation and bonding of the multi-layer laminate.

When considering laminate composites made using an air-laid middle layer, the advantage of using high strength meltspun webs can be clearly seen. Even after fusing the binder fibres to create a self-supporting web, the airlaid web has relatively low dry and wet strength. Much of the strength, particularly wet strength, of the inventive laminate composite comes from the outer meltspun layers. When producing a laminate composite with low basis weight meltspun web outer layers, for example about 5 gsm, it is advantageous to use high strength meltspun polypropylene webs which have significantly higher tensile strength than conventional meltblown polypropylene webs of a similar basis weight. For example, the geometric mean wet tensile strength index of the high strength meltspun polypropylene webs is about three times greater than that of conventional meltblown polypropylene webs. Table I shows that the wet strength of the resulting laminate composite made using high strength meltspun outer layers (Example 1) is similar to the wet strength of other high woodpulp content, commercial wiping substrates based on airlaid, multi-bond airlaid and coform technologies. Whereas Table G shows that a 3-ply laminate with a similar basis weight, made using conventional polypropylene meltblown web outer layers (Example 7) has a significantly lower wet tensile strength when compared to substrates made using airlaid, multi-bond airlaid and coform technologies. It is doubtful whether a material (Example 7) with such low wet strength could perform satisfactorily as a wiping substrate.

In the present invention, it is advantageous for the outer layers of the composite nonwoven to be hydrophilic so that the composite nonwoven can absorb rapidly and fully the aqueous solution of surfactants, perfumes, biocides, and stabilisers (the so called 'lotion') applied by the wet wipes converter or manufacturer. The amount of lotion applied to the substrate is typically about 300% by weight. A number of techniques for conferring hydrophilicity to meltspun webs are known, including (but not exclusively) melt additives, and application of topical treatments to the surface of the meltblown filaments and/or to the web itself. As will be shown in the Examples, in the present invention both techniques have been evaluated.

Hydrophilic melt additives typically contain as the active agent a hydrophilic molecule, examples of which include (but not exclusively) linear and/or branched poly(ethylene oxide) (PEO) and fatty acid glyceride esters, both having a relatively low molecular weight. The hydrophilic melt additive is usually compounded as a masterbatch using a similar type of polymer resin as it will be mixed with, in this case polypropylene. The hydrophilic additive masterbatch is intimately mixed at the desired addition rate with the polypropylene resin pellets before entering the heated screw extruder at the start of the filament spinning process. Immediately upon filament spinning, the hydrophilic additive is distributed more or less evenly throughout the filament. The hydrophilic molecules then slowly diffuse to the surface of the filament creating a thin hydrophilic layer on the filament surface. The diffusion process may take several days before the filaments and nonwoven web is sufficiently hydrophilic or 'wettable'. In one embodiment of the present invention, a hydrophilic melt additive, grade TPM12713 (available from Techmer PM of Clinton, Tenn., USA) was mixed at a rate of about 2% by weight with 35 MFR polypropylene resin pellets. The mixture of polypropylene and additive pellets were then fed via a hopper into a heated screw extruder at the start of the meltblown filament spinning process. The resulting meltblown web when initially made did not absorb a drop of water placed on the web surface within 30 seconds. However, after seven days storage at room temperature, a drop of water placed on the web surface was absorbed in less than 1 second.

Another common technique for making a hydrophilic meltspun web, is the topical application of treatment chemicals, applied either to the meltspun filaments before web formation, and/or to the meltspun nonwoven web. There are a number of known techniques for applying the topical treatment including (but not exclusively) foam application, spray application, padding, and kiss roll coating. In these techniques, an aqueous solution of the treatment chemical is first prepared at a suitable concentration, and this solution is applied by foam, spray, padder or kiss roll to the meltspun filaments and/or web. The treatment agents are hydrophilic chemicals, most commonly in the class of surfactants. These include (but not exclusively) anionic surfactants such as sodium laureth sulphate, sodium dioctyl sulphosuccinate and fatty acid salts (soaps); cationic surfactants such as benzalkonium chloride, and cetylpyridinium chloride; non-ionic surfactants such as poly(ethylene oxide), polysorbates, and fatty alcohols. An active area of research in recent years has been the development of topical treatments for meltspun nonwovens used as components of personal hygiene articles (disposable diapers, incontinence products, feminine hygiene products, and the like). The hydrophilically treated meltspun web must meet certain ethical requirements, for example must not cause irritation or sensitisation when in prolonged contact with the wearer's skin. Depending on how long the personal hygiene article will be in service, there is a need for temporary, semi-durable or durable hydrophilic topical treatments. In the case of the present invention, the meltblown webs on the outside of the nonwoven composite need have only a temporary hydrophilic effect to allow absorption of the aqueous lotion which is applied to the nonwoven composite during the wet wipe converting process. Thereafter a hydrophilic nature is conferred to the wet wipe by the aqueous lotion which commonly contains one or more surfactant chemicals. In one embodiment of the present invention, an aqueous solution was prepared using Unifroth 1387, a surfactant containing sodium dioctyl sulphosuccinate (available from Unichem Inc. of Haw River, N.C., USA). In two experiments, this solution was sprayed on the freshly spun polypropylene meltblown filaments under controlled conditions to give two surfactant add-on levels (a) about 0.5% surfactant by weight on the filaments, and (b) about 1% surfactant by weight on the filaments. The treatment was applied to the meltblown filaments before they were collected on the rotating collection drum. In both experiments, the resultant polypropylene meltblown nonwoven web was made wettable such that it absorbed a drop of water placed on its surface in less than 1 second. A similar result can be obtained by spraying an aqueous solution of this surfactant under controlled conditions on to one or both surfaces of a previously untreated polypropylene meltblown nonwoven web. The web can be subsequently dried if necessary by application of heat, and/or by blowing air over and/or through its surface, and/or by allowing the web to air dry under ambient conditions. By this method, surfactant add-on levels of (a) about 0.5% surfactant by weight on the web and (b) about 1% surfactant by weight on the web, resulted in wettable nonwoven web such that when a drop of water placed on its surface being absorbed in less than 1 second. It will be understood by those skilled in the art that similar wettability results can be obtained by alternate application techniques with this or other surfactants.

Middle Layer Sheet Material

An airlaid middle layer sheet material was prepared from the combination of selected woodpulp, and selected thermoplastic fibres. With regard to the woodpulp, there are several types which may be used. Typically they are kraft or sulphite pulps, may be bleached or unbleached, may contain some recycled pulp fibres or be 100% virgin pulp, and they may optionally be treated with a chemical debonding agent to reduce inter-fibre bonding. In a preferred embodiment of the present invention, the woodpulp is treated with a chemical debonding agent to provide a composite nonwoven with improved softness and bulk.

Chemical debonding agents are well known in the manufacture of paper products and nonwoven materials. Woodpulps treated with chemical debonding agents are particularly used in the manufacture of absorbent articles such as diapers, incontinence products, feminine hygiene products, spill control items, and the like. The debonding agents are mixed with cellulosic fibres to inhibit the formation of bonds between the fibers after wet or dry-forming. Debonding agents are described and disclosed in U.S. Pat. Nos. 4,482,429, 4,144,122 and 4,432,833. Debonding agents also assist in the process of defiberising pulp sheets by means of hammer mills and the like, by reducing the amount of energy needed per kg of pulp to separate and individualise the pulp fibres.

Debonded fluff pulps are available from a number of manufacturers. The pulp used in the Examples section is grade NF405, a kraft pulp made from southern pine wood, available from Weyerhaeuser Inc. Other suitable debonded fluff pulps can be used in place of the NF405 grade, including a grade designated as Golden Isles 4822, available from Georgia-Pacific Inc.

The thermoplastic fibres present with the woodpulp in the middle layer sheet material are necessary to allow (a) the thermal or ultrasonic bonding of adjacent layers, and (b) if desired, the formation of a self-supporting sheet material by the thermal fusing of some or all of the thermoplastic fibres by means of a hot air oven, or a through air drier, or the like. The thermoplastic fibres may be composed of a single resin, or may be composed of two resins in the form of bicomponent fibres. The cross-section of a bicomponent fibre may include configurations such as sheath-core (central or offset core), side-by-side, multi-segment pie, and other configurations known to those skilled in the art. A mixture of two or more types of thermoplastic fibre may be used, including, but not limited to, blends of fibres having different lengths and/or diameters and/or shape or configuration and/or material construction. As a general principle, the thermoplastic fibres should be chemically compatible with the material(s) comprising the outer layers. For example, when the outer layers comprise a high strength meltblown nonwoven made from polypropylene filaments, it is preferable that the thermoplastic fibres are also made from polypropylene. In the case where the thermoplastic fibres have a bicomponent configuration, for example sheath-core, it is preferable that the sheath component be made from polypropylene. In the case of a mixture of two or more thermoplastic fibres, it is preferable that at least one type of fibre be either polypropylene, or has a polypropylene sheath in the case of a bicomponent fibre. The thermoplastic fibres are generally shortcut having a length of 10 mm or less, and should have a denier between 0.1 and 10 denier, and may be crimped or uncrimped. For ease of handling and dispersion in airlaid or wetlaid systems, a chemical finish may be applied to the thermoplastic fibres.

Figure 10:
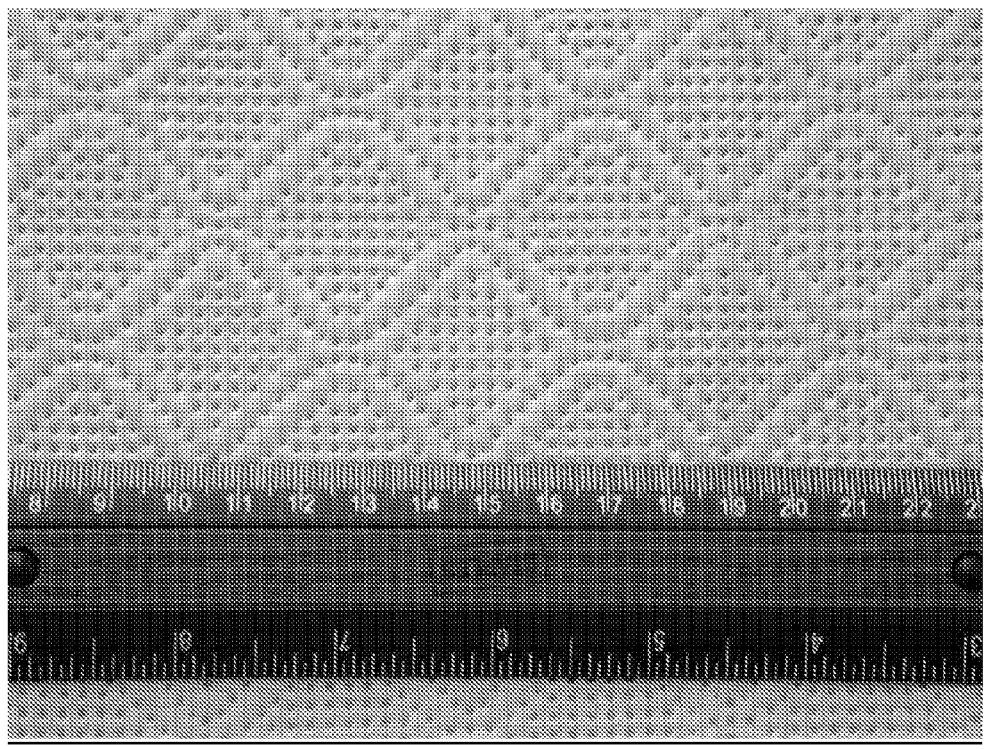
FIG. 10 is a photograph of the inventive laminate after thermal bonding with the embossing pattern used to produce all the Examples. The rule in the photograph lies in the cross-direction, showing both millimeter and inch based scales.

A further advantage of adding thermoplastic fibres to the middle layer is to enhance the clarity and definition of the pattern imparted to the composite nonwoven when bonding with a thermal or ultrasonic embossing calender. FIG. 10 illustrates the embossed pattern clarity which can be achieved with the inventive laminate.

In forming the airlaid web, the equipment may be set up to give either (a) a substantially uniform mixture of the woodpulp and thermoplastic fibres, or (b) a layered or stratified structure where the concentration of thermoplastic fibres is higher close to the top and bottom surface of the sheet material, and consequently the centre of the sheet material has a relatively high percentage concentration of woodpulp fibres. The latter stratified structure may be desirable in order to achieve better thermal bonding between the middle layer sheet material and the outer meltspun layers. The degree of stratification is to some extent controllable.

Equipment for the production of airlaid webs is available from a number of suppliers including (but not exclusively) M & J (Denmark, a subsidiary of Oerlikon Neumag), Dan-Web (Denmark) and Celli S.p.A. (Italy). In the following Examples, the airlaid middle layer was made on a pilot machine supplied by Dan-Web.

Equipment for the production of wetlaid webs has long been known. In the wet forming of a blend of woodpulp and thermoplastic fibres, the use of an inclined wire fourdrinier former is preferable because it allows the fibre blend to be prepared as a highly dilute suspension in water prior to sheet formation, resulting in a more uniform sheet. U.S. Pat. No. 2,045,095 describes the general principles an operation of an inclined wire fourdrinier machine. The woodpulp fibres commonly used to make wet formed paper or nonwoven sheets are kraft and/or sulphite pulps, and are not normally treated with chemical debonding agents before the start of the wet forming process. However it has been found that certain chemically debonded fluff pulps, including Weyerhaeuser kraft pulp grade NF405, can be successfully used to make a uniform wet formed web, albeit the resulting web has lower strength than an equivalent basis weight web made from a non-chemically debonded southern pine kraft pulp. The choice of thermoplastic fibre(s) for use in wet forming the middle layer sheet material is substantially similar to that described above for the air forming method. A shorter fibre length may be desirable for easier fibre dispersion and wet forming, for example 12 mm or less. The chemical finish applied to the fibres is chosen to permit their easy dispersion in water, and uniform formation in the wetlaid sheet.

By using a wet forming machine with more than one headbox, a layered or stratified sheet structure may be produced, similar in concept to that described above for airlaid webs, such that the concentration of thermoplastic fibres is higher close to the top and/or bottom surface of the wetlaid sheet material, and where the centre of the wetlaid sheet has a relatively high percentage concentration of woodpulp fibres.

The inventive fabric finds applications e.g. as wet and dry wipes for consumer in domestic & industrial use, medical wipes (low lint), filtration media of various types, absorbent, low lint media for medical use, e.g. around surgical drape fenestrations, absorbent meat pads (for absorbing juices from meat), absorbent products for spill control (chemical spills, oil spills, etc) and as a component of incontinence products or feminine hygiene pads.

The following non-limiting examples are intended to illustrate the product and process of the invention and not to limit the invention in any manner.

EXAMPLES

In the description above and in the non-limiting Examples that follow, the following test methods were employed to determine various reported characteristics and properties. ASTM refers to the American Society for Testing and materials, INDA refers to the Association of the Nonwovens Fabrics Industry, and IEST refers to the Institute of Environmental Sciences and Technology.

Testing was generally carried out in accordance with the test methods recommended by INDA; any deviation from an INDA test method is noted in the text. Prior to the testing of dry properties, the samples were conditioned for 24 hours in a controlled environment at about 20° C., and 50% relative humidity, unless specified otherwise.

Basis weight (in grams per square meter, or gsm) was measured by a test method that generally follows the INDA test method IST 130.1 (1998). Samples were die cut to 8 inches by 8 inches (20.3 cm by 20.3 cm), and weighed in grams to four decimal places on a digital balance. The basis weight is calculated by dividing the sample weight (in grams) by the sample area (in square meters). In the case of samples of pre-packaged wipes, the dimensions of the wipe were measured to the nearest millimeter, and its area in square meters calculated. In the case of samples of pre-packaged wet wipes, sample sheets were allowed to air dry and were then conditioned in a controlled environment before weighing. Normally measurements were made on 4 or more samples, and an average value was calculated.

Tensile strength (T.S.) testing was carried out using a model 5500R tensile test instrument supplied by Instron Inc. Samples were cut to one inch (2.54 cm) wide strips. Usually both the MD and CD directions were tested. The initial separation between the sample grips was five inches (12.7 cm), and the strain rate was 30 cm/minute. The instrument provides a report of tensile strength, elongation and toughness (tensile energy absorption) at sample break point. Measurements on wet samples were carried out by pre-soaking the sample strips in de-ionised water. At least 4 individual test strips were tested per sample, and an average value was calculated. The geometric mean of MD and CD tensile strength was calculated from the square root of the product of MD and CD tensile strength. Geometric mean tensile strength index (in N/m per gsm) was calculated by dividing the geometric mean tensile strength (in N/m) by the basis weight (in gsm) of the test sample.

Elmendorf tear strength was measured by a test method that generally follows the method of ASTM D 5734, using a model 1653 Elmendorf tear test apparatus supplied by H. E. Messmer of London. The apparatus is fitted with a model 60-8 pendulum, capable of measuring up to 7840 mN. Measurements on wet samples were carried out by pre-soaking the test pieces in de-ionised water. Normally measurements were made on 4 or more test pieces, and an average value was calculated.

Fabric thickness was measured by a test method that generally follows the INDA test method IST120.1 (1998). The equipment used was a Thwing-Albert ProGage (Thwing-Albert, West Berlin, N.J., USA) equipped with a 2.54 cm diameter (506 $mm^2$ area) presser foot exerting a pressure of 4.1 kPa on the test sample, 6.3 cm diameter anvil, 1000 micron maximum range and 0.1 micron display resolution. At least 10 measurements were made at random positions across each sample and an average value was calculated.

Bulk (in cubic centimeters/gram, or cc/g) is calculated by dividing fabric thickness (in microns) by fabric basis weight (in gsm). The latter properties are measured by the test methods previously described. Wet and dry bulk are calculated from the wet and dry thickness of the nonwoven fabric respectively. A high value of bulk indicates a lofty, low density material.

Burst strength was measured by a test method that generally follows the method of ASTM D-774. The equipment used was a Mullen-type hydraulic diaphragm bursting tester manufactured by B F Perkins & Son Inc., and supplied by H E Messmer of London. Measurements on wet samples were carried out by pre-soaking the sample test pieces in de-ionised water. Normally measurements were made on 4 or more test pieces, and an average value was calculated.

Absorption capacity was measured using the following test method. After conditioning, test pieces 100 mm by 100 mm were die cut from the sample to be tested and individually weighed to the nearest 0.001 g. The test pieces were immersed in a bath of de-ionised water at about 20° C. After 60 seconds the test pieces were individually removed from the bath, and a paper 'tail' (approximately 3 mm by 25 mm) was loosely attached to one corner of the test piece by lightly pressing together the tail to a corner of the sample. Each test piece was then suspended vertically downwards from a horizontal bar by using an alligator clip to grip the corner of the test piece opposite the paper tail. Excess water was allowed to drip from the test piece, the drips being directed away from the test piece via the paper tail. After 5 minutes the test piece (minus the paper tail) was reweighed to the nearest 0.001 g. The absorption capacity was calculated as follows, $$\text{Absorption Capacity (\%)} = 100\% \times [\text{Final weight} - \text{Initial weight}]/\text{Initial weight}$$

Normally measurements were made on 4 or more test pieces, and an average value was calculated.

Abrasion resistance was measured by a test method that generally follows ASTM D 4966. The apparatus used was a Martindale abrasion tester supplied by James H. Heal & Co. Ltd. of Halifax, England. The wool abrading cloth used was supplied by James H. Heal Ltd., and conforms to the property requirements specified in Table 1 of EN ISO 12947-1. The felt backing pads were also supplied by James H. Heal Ltd. The pressure applied to the specimens during testing was 12 kPa. To improve consistency, the testing of all samples was carried out by the same operator. To determine wet abrasion resistance, the test samples were wetted with deionised water. The test was ended when the sample was sufficiently abraded that a hole appeared in the sample, and the number of rubs noted. Normally measurements were made on 4 or more test pieces, and an average value was calculated. A high number of rubs is indicative of a material resistant to abrasion.

The softness or "hand" of nonwoven wiping substrates is a somewhat subjective property, especially when evaluating wet samples. Usually the hand of a wet nonwoven sample is considerably softer and more flexible than that of the corresponding dry sample. Whilst there is no widely recognised instrumental method for measuring wet hand or softness, there are test methods for measuring dry fabric flexibility. The Handle-o-Meter instrument was used, utilising a test procedure that generally follows ASTM D2923. The nonwoven to be tested is deformed through a narrow slot by a blade-shaped plunger, and the required force (in grams-force) is measured. This force is a measure of both the flexibility and surface friction of the nonwoven. The instrument used was a Thwing Albert Handle-o-Meter, model 211-300, with a maximum scale reading of 100 grams-force. A low scale reading is indicative of a soft, flexible material. The slot width was set to 0.5 inch (12.7 mm), and test pieces were cut to 6 inches by 6 inches (152.4×152.4 mm). The samples were allowed to condition in an air conditioned room (at about 23° C., 50% RH) for about 24 hours before measurements were made. Four test pieces were tested per sample, in both the MD and the CD, and also turning the test piece over so as to test both faces, and average values were calculated. Samples from store purchased packs of wet wipes were allowed to air dry, and were then conditioned in an air conditioned room before testing. As a result of the converting process and packaging, such samples are usually folded and/or creased and wrinkled, which usually results in artificially low test values.

The cellulose content of a sample was determined by dissolving the cellulose fraction in concentrated sulphuric acid, as follows. The test sample was cut into 32 approximately 25×25 mm pieces, dried in an oven at 105 deg C., and the collection of 32 pieces weighed to the nearest 0.1 mg. The 32 sample pieces were placed in a 500 ml Erlenmeyer flask, and 320 g of 72% sulphuric acid was added to the flask. The contents of the flask were stirred at room temperature for 24 hours. The contents of the flask were then diluted by pouring them with stirring into 4 liters of distilled water. The liquid and non-cellulose residue was filtered through a glass fiber filter disk which had been pre-weighed after oven drying. The filter disk plus residue was dried in an oven at 105 deg C. until bone dry, and then weighed to the nearest 0.1 mg. The weight of non-cellulose residue on the filter disk was calculated from the before and after weights of the filter disk. The percentage of cellulose in the sample was calculated from Cellulose content (%)=100%×[Initial sample weight−Residue weight]/Initial sample weight Pore size measurements were carried out by the University of Tennessee Nonwovens Research Laboratory. Pore Size was measured using an Automated Capillary Flow Porometer Model #CFP-110-AEX. Wet up and dry up test was run using Galwick fluid having a surface tension of 15.6 Dynes/cm.

Filament diameter measurements were carried out by the University of Tennessee Nonwovens Research Laboratory. Using a scanning electron microscope, the diameter of at least 100 filaments was measured and the average calculated.

Wet linting (particles and fibres shed from sample fabrics into water)—gravimetric method. A test method that generally follows INDA test method IST 160.3 (1998) was used. 10±0.1 grams of dry sample were accurately weighed, and placed in a clean, dry 500 milliliter glass jar with plastic screw top closure. 400±1 milliliters of deionised water at room temperature were added to the jar. After securing the jar closure, the jar and contents were manually shaken vigorously for 60±1 seconds. The test sample was immediately removed using a clean glass rod, and the liquid filtered through a pre-weighed Whatman glass fibre filter disk. The filter disk was dried in a laboratory oven at 105° C. for about 2 hours, and then weighed to four decimal places on an analytical balance. The amount of lint released into water (in parts per million, or ppm) is calculated from {change in filter disk weight (g)×1,000,000/original weight of sample (g)}. Normally measurements were made on 4 or more test pieces, and an average value was calculated.

Wet linting (particles and fibres shed from sample fabrics into water)—particle count method. The biaxial shake test described in IEST test method IEST-RP-CC004.3, section 6.1.3 was used. This test procedures measures both readily releasable particles (present on the surfaces of the wipe), and particles generated by mechanical agitation of the wiper in water. Testing of the samples was carried out by RTI International, 3040 Cornwallis Road, Research Triangle Park, N.C., USA. The results are expressed as the number of particles released and generated per square meter of wiper. Two sets of measurements were made on each test piece, and average values calculated.

The inventive materials may be used either dry or after wetting with water or aqueous solutions. If the intended application requires the fabric to be used in the wet state, for example wet wipes, the measurement of wet test properties is usually more relevant. In the following Examples, a number of wet test properties were measured.

Manufacture of High Strength, Meltblown Webs

A high strength meltblown web was prepared from Basell Profax grade PH835 polypropylene resin, which has a melt flow rate of 34 g/10 minutes (34 MFR). In other experimental work, high strength meltblown webs were also produced from ExxonMobil grade PP3155 polypropylene resin (36 MFR), and these webs had very similar properties to the webs made from the Profax resin. The equipment used was a nominal 25 inch (63 cm) wide pilot line operated by Biax Fiberfilm Corporation located at Quality Drive, Greenville, Wis., USA. The pilot line equipment consists of five major elements in sequence—a screw extruder, two gear pumps, a meltblown die, a collection drum and a roll wind-up station. The meltblown die is of the multiple row of spinholes (at least 10 rows) design as generally described in U.S. Pat. No. 6,013,223 to Biax-Fiberfilm Corp. The screw extruder is used to melt the polypropylene resin (and mix it with a melt additive, if used) and supply under pressure an essentially uniform molten mass of resin at a temperature of approximately 550° F. (288° C.) to the two gear pumps. The two gear pumps operate in parallel, and rotate at the same low speed, typically about 12 revolutions/minute, each gear pump delivering about 30 cm$^3$ of molten resin per revolution to the meltblown die. At this gear pump speed, the throughput of resin is about 32.4 kgs/hour, or about 0.108 grams/minute through each spinhole. The molten resin is maintained at about 550° F. (288° C.) as it passes under pressure through the gear pumps and into the meltblown die. The meltblown die is equipped with about 5000 spinholes arranged in multiple rows, each spinhole having an internal diameter of 0.015 inches (0.38 mm). The pressure inside the die body was about 1200 psi (8276 kPa) and the molten resin was forced through the spinholes as fine filaments. The still molten filaments emerging from the spinholes were attenuated by streams of high speed hot air (about 430° F., 221° C.) flowing essentially parallel to and in the same direction as the filaments. U.S. Pat. No. 6,013,223 describes the use of a draw jet to further attenuate the filaments. However in making the meltblown webs used in this invention, the use of a draw jet was not found to be necessary. A fine mist spray of water was used to cool the filaments between the meltblown die and the collection drum. The mist spray was applied approximately perpendicularly to the direction of movement of the filaments. The attenuated filaments were blown on to, and collected on a rotating vacuum drum covered in a foraminous material. The distance between the meltblown die and the surface of the drum was about 14 inches (35 cm). The meltblown filaments thus collected on the rotating drum formed a self-supporting nonwoven sheet material, which could readily be removed from the drum and wound into a roll without the need for an additional bonding process, even with basis weights as low as about 3 gsm. For a given resin throughput, by varying the surface speed of the collection drum, the basis weight of the web of meltblown filaments could be altered. An approximately 5 gsm web was made at a drum surface speed of 535 feet/minute (163 meters/minute). To minimise any loss of web width, it was found to be preferable to locate the wind-up station close to the rotating collection drum so as to reduce the draw forces on the web.

As shown in Table C, a 7.7 gsm sample had an average filament diameter of 3.56 microns and a mean pore size of 27 microns A hydrophilic version of the above web was produced by using a fine mist spray of an aqueous solution of a surfactant to cool the filaments in place of a fine mist spray of water. In some experiments, the surfactant used was Cytec Aerosol GPG (general purpose grade), a sodium dioctyl sulphosuccinate solution. In other experiments, the surfactant used was Unifroth grade 1387 (a sodium dioctyl sulphosuccinate solution), supplied by Unichem Inc. The surfactant solution was applied to the filaments using a spray boom consisting of seventeen type MTP-1510 nozzles (available from American Nozzle Co.). About 8.8 US gallons/hour (33.3 liters/hour) of the surfactant solution were applied through the spray nozzles. In the case of both surfactants, the concentration of the surfactant solution was adjusted such that the application rate of surfactant to filaments was approximately 1% by weight of solids. In the following Examples, the high strength meltblown webs were treated by this method.

Alternatively, hydrophilic meltblown polypropylene filaments were produced using a hydrophilic melt additive, grade TPM 12713 available from Techmer PM, Clinton, Tenn., USA. The active ingredient is proprietary and is not disclosed. The melt additive, 2% by weight, was added to the polypropylene resin at the start of the screw extruder which melted and mixed it with the molten polypropylene resin. Thereafter the molten mix was processed into meltblown filaments and a nonwoven web as described above. In common with some other melt additives, the hydrophilic active ingredient gradually diffuses to the surface of the filaments. Hence the wettability of the web improved after several days of ageing at ambient temperature.

Manufacture of Polypropylene Webs by the Conventional Meltblown Process

The polypropylene meltblown webs, made by the conventional meltblown process, used in this invention were prepared on a 20 inch (0.51 m) wide pilot line owned and operated by the University of Tennessee Nonwovens Research Laboratory. The polypropylene resin used was grade Metocene MF650Y supplied by LyondellBasell, with a melt flow rate of about 1800 g/minute at 230° C. Throughput of resin was about 120 grams/minute. The meltblown die temperature was about 450° F. (232° C.) and the attenuating air temperature was about 500° F. (260° C.). Webs with basis weights ranging up to 20 gsm were produced. A nominal 5 gsm meltblown web was produced at a line speed of about 47 meters/minute. The webs were not treated with any chemicals. As shown in Table C, an 11 gsm sample had an average filament diameter of 5.4 microns and a mean pore size of 46 microns.

Manufacture of Airlaid Webs

The airlaid webs were made on a pilot line operated by Marketing & Technology Services (MTS), located in Kalamazoo, Mich., USA. The pilot line is about 60 cm wide, and is of the Danweb design with five airlaid forming stations. The woodpulp used in all the trials was Weyerhaeuser grade NF405, a chemically debonded woodpulp termed a 'fluff pulp'. The woodpulp, supplied as a continuous sheet in roll form, was defibered into largely individual fibres using one or more hammer mills. Several types of man-made binder fibres were used in the trials including a 1.5 denier, 6 mm polyethylene sheath:polyester core bicomponent fibre (Celbond type T-255 from Invista), a 2.0 denier, 6 mm polypropylene sheath:polyester core bicomponent fibre, and a 2.2 denier, 5 mm polypropylene fibre from FiberVisions. The binder fibres can be used on their own or as a blend. In addition to preparing airlaid webs with different basis weights, and/or different types and/or percentage content of binder fibre(s), it is possible to create an airlaid web with either an essentially uniform blend of pulp and binder fibres, or alternatively a stratified or gradient Z-direction structure. The latter type of structure is created by, for example, supplying a pulp-binder fibre blend with a relatively high percentage of binder fibre to the first and last airlaid forming stations (numbers 1 and 5), and supplying a second pulp-binder fibre blend with a lower percentage of binder fibre to the other forming stations. In this example, the resulting airlaid web has a relatively high binder fibre content near its top and bottom surfaces, and a relatively high woodpulp content near the middle of the web's thickness.

In terms of thermally bonding a polypropylene meltblown web to an airlaid web made of fluff pulp and binder fibre, it was found that a stronger bond resulted when using binder fibres containing polypropylene. The use of polyethylene containing binder fibres (e.g. the Celbond T-255 type) gave weaker thermal bonding to the polypropylene meltblown web. It is generally known that polyethylene and polypropylene have limited compatibility with regard to thermal bonding to each other.

The MTS pilot line is equipped with a hot air oven which can be used to fuse or partially fuse the binder fibres in the airlaid web so as to produce a self-supporting web. In the pilot scale manufacture of the airlaid webs used in these Examples, the airlaid webs were oven fused sufficiently to produce self-supporting webs for ease of handling later. It should be noted that oven fusing is not a necessary element of the intended manufacturing process.

Manufacture of Wetlaid Webs

The wetlaid webs used in this invention were produced on a pilot scale, inclined wire wet former owned and operated by Ahlstrom USA Inc. in Windsor Locks, Conn., USA. The woodpulps used were either (a) Weyerhaeuser NF405 chemically debonded fluff pulp delivered in roll form, or (b) Weyerhaeuser Grand Prairie kraft pulp delivered in sheet form. In preparing the fibre blend, a weighed quantity of woodpulp was first added to a measured quantity of water in a Hollander-type beater where it was circulated and lightly brushed to defiber it. At the end of the brushing cycle, a weighed quantity of the selected binder fibre(s) was added to the pulp slurry, and the fibrous mass circulated (but not brushed) for about 10 minutes to mix and blend the pulp and binder fibres, before the entire contents of the beater were pumped to a holding tank equipped with a stirrer. No wet strength agents or other chemicals were added to the fibrous mix. The fibrous slurry was pumped to the headbox of the wet former together with a suitable quantity of dilution water to give a sheet of the desired basis weight. The wet sheet so formed was dried on rotating can driers and wound up. The sheet formed from the fluff pulp was considerably weaker than that formed from the kraft pulp, but it had good formation, and was strong enough to be handled.

Production of Laminates

The three layers of the laminates were bonded together by means of thermal point bonding using a pilot scale embossing calender, with one engraved steel roll and one plain steel anvil roll. The engraved point-bond pattern used is shown in FIG. 10. The engraved pattern is composed of a multiplicity of approximately round bond points, the majority of being about 1.25 mm in diameter, the remainder being about 1 mm in diameter. The depth of the engraved pattern on the roll is about 1.25 mm, and the bond area is about 8.5%.

Both calender rolls were heated. Prior to bonding a series of samples, the surface temperature of both rolls was measured using a digital temperature gauge (model HH802U from Omega Engineering, Stamford, Conn.) fitted with a surface contact thermocouple probe (model 98226 from Omega Engineering).

Prior to thermal bonding, a 3 to 4 meter long 'sandwich' was hand collated by laying flat on a long table a length of each of the precursor webs such that the airlaid web was in the middle, and a meltspun web was on each side of the airlaid web. The precursor webs were used at the width at which they were made, i.e. approximately 60 cm. After adjusting the temperature, nip pressure and rotational speed of the embossing rolls to the desired values, the collated sandwich was passed through the nip of the embossing calender at a constant linear speed of about 20 meters/minute.

During this pilot scale, hot embossing procedure the web materials were unrestrained in both MD and CD. A small amount of dimensional shrinkage occurred during thermal embossing, typically about 3% in the MD and about 2% in the CD, which resulted in the final laminate having a higher basis weight than the nominal target value. It is expected that in an industrial process with proper web restraint this thermal shrinkage will be reduced.

Examples 1-3

Examples 1 to 3 illustrate the manufacture and properties of 3-ply laminates with a high woodpulp content, together with other desirable properties. The composition and properties of these Examples is summarised in Table E.

In Examples 1-2, the two outer layers were taken from a roll of polypropylene high strength meltblown web of about 5 gsm basis weight, prepared as described above from Basell Profax grade PH835 polypropylene resin. In Example 3, the two outer layers were taken from a roll of polypropylene high strength meltblown web of about 8 gsm basis weight, prepared as described above from Basell Profax grade PH835 polypropylene resin. The meltblown filaments were topically treated in the manner described above with an aqueous solution of Cytec Aerosol GPG surfactant. The concentration of the solution was adjusted to give a surfactant add on of about 1% by weight.

The middle layer of the laminate was an airlaid web of about 45 gsm basis weight, and comprised of a mixture of defibered fluff pulp and synthetic binder fibres. The percentage and type of binder fibre used in each Example is shown in Table E. In Example 2, a blend of two types of binder fibre was used. In Examples 1 to 3, and all following Examples employing an airlaid middle layer, the airlaid web had a gradient structure in that the top and bottom surfaces of the web had a proportionately higher percentage of binder fibres as compared to the centre of the web. And conversely the centre of the airlaid web had a proportionately higher percentage of fluff woodpulp as compared to the top and bottom surfaces of the web. Examples 1 and 3 contained about 65% or more woodpulp.

TABLE E

HIGH STRENGTH MELTBLOWN/AIRLAID WEB/HIGH STRENGTH MELTBLOWN

|  | Ex. 1 | Ex. 2 | Ex. 3 |
| --- | --- | --- | --- |
| Nominal Construction (gsm) | 5/45/5 | 5/45/5 | 8/45/8 |
| Binder fibre content of airlaid web, %, type | 20% PP:PET bicomponent | 15% PP + 15% PE:PET bicomp. | 10% PE:PET bicomponent |
| Nominal Woodpulp Content, % | 65.5 | 57.3 | 66.4 |
| Basis Weight, (gsm) | 59.5 | 55.1 | 63.8 |
| Dry Tensile Strength, MD (N/m) | 357 | 293 | 463 |
| Wet Tensile Strength, MD (N/m) | 300 | 248 | 426 |
| Wet Tensile Strength, CD (N/m) | 165 | 126 | 212 |
| Wet T.S. geometric mean (N/m) | 222 | 177 | 301 |
| Wet Toughness, MD (J) | 0.132 | 0.127 | 0.251 |
| Wet Toughness, CD (J) | 0.080 | 0.081 | 0.213 |
| Wet Elmendorf Tear Strength, MD (mN) | 1,120 | 1,160 | 1,240 |
| Dry Thickness (microns) | 641 | 693 | 725 |
| Dry Bulk (cc/g) | 10.8 | 12.6 | 11.4 |
| Wet Thickness (microns) | 501 | 439 | 516 |
| Wet Bulk (cc/g) | 8.4 | 8.0 | 8.1 |
| Absorption capacity (%) | 1,007 | 1,140 | 1,035 |
| Handle-o-Meter, Dry, MD (g.f) | 67 | 66 | 74 |
| Handle-o-Meter, Dry, CD (g.f) | 55 | 54 | 62 |
| Dry Martindale Abrasion Resistance (rubs) | 70 | 69 | 87 |
| Wet Martindale Abrasion Resistance (rubs) | 51 | 49 | 42 |
| Wet Lint, gravimetric method (ppm) | 35 | 13 | 18 |

The pilot scale collation and lamination procedure described above was followed. Approximately 4 meters of each web material were collated by hand on a flat surface to give the required laminate structure, that is, {meltblown-45 gsm airlaid web-meltblown}. The surface temperature of the engraved calender roll was adjusted to about 113-115° C. and the surface temperature of the anvil calender roll was adjusted to about 108-110° C. (both rolls checked and measured by surface contact thermocouple). Nip pressure was about 450 pounds/linear inch (79 N/mm), and line speed was about 20 meters/minute. The collated sandwich was fed through the nip of the embossing calender and collected at the other side.

The resulting laminates were soft and drapeable, especially in the wet state, and had a pleasing hand. The clarity of the embossed pattern was good, and was similar to that shown in FIG. 10. The test properties of the three Examples are shown in Table E. The laminate composites quickly absorbed water, and absorption capacity was greater than 1000% for all three Examples. The Handle-o-Meter test values for Examples 1 to 3 are broadly comparable with test values for other commercial wiping products, as shown in Table I. The inventive laminates were bulky in both the wet and dry state, and had very good wet and dry abrasion resistance. Tensile strength and tear strength were sufficient to permit the use of the inventive laminates as hard surface wipes or personal hygiene wipes. The amount of wet lint measured for these laminate materials is low, likely due to the relatively small pore size of the meltblown outer layers reducing the loss of pulp fibres through the faces of the laminate.

Examples 4 and 5

Examples 4 and 5 illustrate the manufacture and properties of 3-ply laminates made using a wetlaid middle layer. The composition and properties of these Examples, together with Example 1 as a comparison, is shown in Table F. Examples 4 and 5 contained about 65% or more woodpulp.

TABLE F

HIGH STRENGTH MELTBLOWN/AIRLAID or WETLAID WEB/HIGH STRENGTH MELTBLOWN

|  | Ex. 1 | Ex. 4 | Ex. 5 |
|---|---|---|---|
| Nominal Construction (gsm) | 5/45/5 | 5/45/5 | 5/45/5 |
| Middle layer pulp forming method, pulp type | airlaid, fluff pulp | wetlaid, fluff pulp | wetlaid, kraft pulp |
| Binder fibre content of airlaid web, %, type | 20% PE:PET bicomponent | 20% PE:PET bicomponent | 10% PP mono-component |
| Nominal Woodpulp Content, % | 65.5 | 65.5 | 73.6 |
| Basis Weight, (gsm) | 59.5 | 55.4 | 53.4 |
| Dry Tensile Strength, MD (N/m) | 357 | 565 | 1235 |
| Wet Tensile Strength, MD (N/m) | 300 | 232 | 183 |
| Wet Tensile Strength, CD (N/m) | 165 | 126 | 97 |
| Wet T.S. geometric mean (N/m) | 222 | 171 | 133 |
| Wet Toughness, MD (J) | 0.132 | 0.064 | 0.099 |
| Wet Toughness, CD (J) | 0.080 | 0.060 | 0.116 |
| Wet Elmendorf Tear Strength, MD (mN) | 1,120 | 1,120 | 600 |
| Dry Thickness (microns) | 641 | 431 | 350 |
| Dry Bulk (cc/g) | 10.8 | 7.8 | 6.6 |
| Wet Thickness (microns) | 501 | 366 | 355 |
| Wet Bulk (cc/g) | 8.4 | 6.6 | 6.6 |
| Mullen Burst Strength, Wet (kPa) | 69 |  | 55 |
| Absorption capacity (%) | 1,007 | 428 | 461 |
| Handle-o-Meter, Dry, MD (g.f) | 67 | >100 | >100 |
| Handle-o-Meter, Dry, CD (g.f) | 55 | 71 | 72 |
| Dry Martindale Abrasion Resistance (rubs) | 70 | 106 | 59 |
| Wet Martindale Abrasion Resistance (rubs) | 51 | 26 | 37 |
| Wet Lint, gravimetric method (ppm) | 35 | 15 | 21 |

The pilot scale collation and lamination procedure previously described was essentially followed.

The middle layer of Example 4 was a wet formed blend of Weyerhaeuser NF405 fluff pulp (80% by weight) and 20% by weight of 6 mm PE:PET Celbond binder fibre. The middle layer of Example 5 was a wet formed blend of Weyerhaeuser Grand Prairie pulp (90% by weight) and 10% by weight of 6 mm Herculon T153 polypropylene fibre.

Examples 4 and 5 were soft and drapeable, especially in the wet state, but not as soft as those Examples made with an airlaid middle layer, such as Examples 1 to 3. This is demonstrated in the Handle-o-Meter values for Examples 4 and 5 which are higher than for Example 1—the MD values exceeded the capacity of the instrument. They were bulky, but not as bulky as Examples 1 to 3. They had good abrasion resistance when used as a wipe, either on skin or on hard surfaces. Example 5 (kraft pulp middle layer) had very high dry tensile strength, but this was much reduced in the wet state. Indeed, both Examples with a wetlaid middle layer had lower wet strength as compared to Example 1 (airlaid fluff pulp middle layer). Tear strength and resistance to delamination were adequate for use as hard surface wipes or personal hygiene wipes. The amount of wet lint measured for the laminate materials made with wetlaid middle layers is lower than the equivalent laminates made with an airlaid middle layer. The absorption capacity of Example 1 (airlaid fluff pulp middle layer) is more than double that of Examples 4 and 5 made with wetlaid middle layers.

Hence for a given product design, substituting a wetlaid middle layer for an airlaid middle layer gives a less soft, less bulky laminate with lower absorption capacity.

Examples 6 and 7

Examples 6 and 7 illustrate the improvement in the properties of the laminate brought about by the use of high strength, polypropylene meltblown outer layers as compared to the use of a similar weight conventional polypropylene meltblown web. The composition and properties of these Examples, is summarised in Table G.

TABLE G

MELTBLOWN/AIRLAID/MELTBLOWN

|  | Ex. 6 | Ex. 7 |
|---|---|---|
| Nominal Construction (gsm) | 5/45/5 | 5/45/5 |
| Meltblown web type | high strength | conventional |
| Binder fibre content of airlaid web, %, type | 20% PP:PET bicomponent | 20% PP:PET bicomponent |
| Nominal Woodpulp Content, % | 65.5 | 65.5 |
| Basis Weight, (gsm) | 56.6 | 59.7 |
| Dry Tensile Strength, MD (N/m) | 402 | 103 |
| Wet Tensile Strength, MD (N/m) | 363 | 93 |
| Wet Tensile Strength, CD (N/m) | 228 | 91 |
| Wet T.S. geometric mean (N/m) | 288 | 92 |
| Wet Toughness, MD (J) | 0.184 | 0.024 |
| Wet Toughness, CD (J) | 0.100 | 0.030 |
| Wet Elmendorf Tear Strength, MD (mN) | 1,400 | 960 |
| Dry Thickness (microns) | 620 | 666 |
| Dry Bulk (cc/g) | 10.9 | 11.2 |
| Wet Thickness (microns) | 472 | 454 |
| Wet Bulk (cc/g) | 8.3 | 7.6 |
| Mullen Burst Strength, Wet (kPa) | 75 | 51 |
| Absorption capacity (%) | 996 | 952 |
| Handle-o-Meter, Dry, MD (g.f) | 55 | 54 |
| Handle-o-Meter, Dry, CD (g.f) | 45 | 40 |
| Dry Martindale Abrasion Resistance (rubs) | 61 | 60 |

TABLE G-continued

MELTBLOWN/AIRLAID/MELTBLOWN

|  | Ex. 6 | Ex. 7 |
|---|---|---|
| Wet Martindale Abrasion Resistance (rubs) | 43 | 48 |
| Wet Lint, gravimetric method (ppm) | 28 | 38 |

In both Examples, the outer layers were made from approximately 5 gsm polypropylene meltblown—high strength meltblown web in the case of Example 6, conventional meltblown web in the case of Example 7. The airlaid middle layer was the same in both Examples. Example 7 was difficult to collate and laminate due to the very low strength of the conventional meltblown web. By contrast, Example 6 was easy to collate and laminate.

Table G details the lower strength of the laminate, Example 7, made with conventional meltblown web—wet and dry tensile strength, wet toughness, wet tear strength, and wet burst strength are all substantially lower. The geometric mean wet tensile strength of Example 6 is more than three times greater than that of Example 7. Thickness, bulk, absorption capacity, abrasion resistance and Handle-o-Meter flexibility are broadly similar for both Examples.

Examples 8 to 10

Examples 8 to 10 illustrate the versatility of the inventive product design, including asymmetric product constructions (Examples 8 and 9). 3-ply laminates were made using one or two layers of polypropylene spunbond, and with airlaid or wetlaid middle layers, the latter using fluff pulp or kraft pulp. The composition and properties of these Examples, is summarised in Table H.

The polypropylene spunbond nonwoven used in these Examples was a commercial grade supplied by First Quality Nonwovens, of Great Neck, N.Y., USA. The average filament diameter of this spunbond web was found to be 16.8 microns, as opposed to about 3.5 microns for the high strength polypropylene meltblown web. The average pore size of the spunbond web was found to be 51.5 microns, versus about 27 microns for the high strength polypropylene meltblown web.

In Example 8, the middle layer was a 35 gsm airlaid web comprising fluff pulp and about 20% of PE:PET bicomponent binder fibre. In Example 9, the middle layer was a 35 gsm wet formed web comprising Weyerhaeuser NF405 fluff pulp and about 20% PE:PP sheath:core bicomponent binder fibre. In Example 10, the middle layer was a 35 gsm wet formed web comprising Grand Prairie kraft pulp and about 10% Herculon T153 polypropylene fibre. Due to the use of one or two layers of 13 gsm spunbond nonwoven in these Examples, the wood-pulp content of these laminates was lower than in earlier Examples, but still greater than 50%.

TABLE H

MELTSPUN/AIRLAID or WETLAID WEB/MELTSPUN

|  | Ex. 8 | Ex. 9 | Ex. 10 |
|---|---|---|---|
| Nominal Construction (gsm) | 5/35/13 | 5/35/13 | 13/35/13 |
| Outer layer materials (gsm) | high strength PP meltblown (5)/PP spunbond (13) | high strength PP meltblown (5)/PP spunbond (13) | PP spunbond (13)/PP spunbond (13) |
| Middle layer pulp forming method, pulp type | airlaid, fluff pulp | wetlaid, fluff pulp | wetlaid, kraft pulp |
| Binder fibre content of airlaid web, %, type | 20% PE:PET bicomponent | 20% PE:PP bicomponent | 10% PP monocomponent |
| Nominal Woodpulp Content, % | 52.8 | 52.8 | 51.6 |
| Basis Weight, (gsm) | 55.3 | 51.8 | 62.7 |
| Dry Tensile Strength, MD (N/m) | 532 | 592 | 1093 |
| Wet Tensile Strength, MD (N/m) | 552 | 499 | 933 |
| Wet Tensile Strength, CD (N/m) | 247 | 223 | 442 |
| Wet T.S. geometric mean (N/m) | 369 | 334 | 642 |
| Wet Toughness, MD (J) | 0.400 | 0.258 | 0.514 |
| Wet Toughness, CD (J) | 0.216 | 0.186 | 0.316 |
| Wet Elmendorf Tear Strength, MD (mN) | 2,640 | 1,840 | 2,320 |
| Dry Thickness (microns) | 663 | 422 | 464 |
| Dry Bulk (cc/g) | 12.0 | 8.1 | 7.4 |
| Wet Thickness (microns) | 434 | 364 | 406 |
| Wet Bulk (cc/g) | 7.9 | 7.0 | 6.5 |
| Mullen Burst Strength, Dry (kPa) | 91 | 97 | 108 |
| Absorption capacity (%) | 1,159 | 544 | 346 |
| Handle-o-Meter, Dry, MD (g.f) | 66 | >94 | >100 |
| Handle-o-Meter, Dry, CD (g.f) | 48 | 43 | >100 |
| Dry Martindale Abrasion Resistance (rubs) | >150 | >150 | >150 |
| Wet Martindale Abrasion Resistance (rubs) | 23 | >150 | >150 |
| Wet Lint, gravimetric method (ppm) | 52 | 31 | 79 |

The use of one or two spunbond outer layers, coupled with the use of wet laid middle layers, resulted in laminates which were reasonably soft and flexible, especially in the wet state, but generally less soft and flexible than the Examples previously described. The MD Handle-o-Meter test values for Examples 9 and 10 were both very high. The MD and CD Handle-o-Meter test values for Example 10, with two outer layers of spunbond, were both >100 g.f (i.e. exceeds the full scale capacity of the instrument). Example 8 with an airlaid middle layer and just one spunbond outer layer was more flexible as indicated by lower Handle-o-Meter values.

As expected the use of one or two layers of spunbond nonwoven increases the strength properties of these Examples markedly. The dry bulk of the laminate is influenced by the choice of middle layer—Example 8 with an airlaid middle layer has the highest bulk. The use of spunbond outer layers greatly enhances abrasion resistance—in Example 9, the spunbond face of the laminate was tested both wet and dry, whereas in Example 8 it was the high strength meltblown face which as tested wet. Absorption capacity is highest when debonded fluff pulp is used in the middle layer rather than kraft pulp, and the highest absorption capacity was obtained when the middle layer contained airlaid fluff pulp. When spunbond is used as one or both outer layers of the laminate, the amount of lint released into water (gravimetric method) is higher, particularly Example 10 with two spunbond outer layers, as compared to Examples 1 to 3 made with two meltblown outer layers. Spunbond nonwovens generally have a more open pore structure as compared to meltblown nonwovens of a similar basis weight. Hence the higher amount of lint released by Examples 8 to 10 is likely due to the larger pore size of spunbond nonwoven outer layers of the laminate.

Comparison with Competitive Materials

In Table I the test properties of Examples 1, 3 and 6 are compared with store purchased commercial wet wipes whose substrate is made by four different technologies—airlaid (resin bonded), multi-bond airlaid (MBAL), coform and spunlace (hydro-entangled carded web).

The woodpulp content of the commercial wipes substrates was determined using the sulphuric acid dissolution procedure previously described. All the wiping substrates, with the exception of the spunlace sample, contain a high percentage of woodpulp. By microscopic examination the spunlace substrate contains no woodpulp.

In comparing MD and CD wet tensile strength and toughness, Examples 1, 3 and 6 are similar to or better than the airlaid, multi-bond airlaid and coform samples. Wet MD Elmendorf tear strength is comparable for the multi-bond airlaid substrate and Examples 1, 3 and 6; the coform and particularly the airlaid substrates have lower tear strength. As expected, the spunlace sample has high tensile and tear strength due to its nature (hydro-entangled staple length fibres)—arguably it is stronger than it need be to function as a wiping substrate.

The wet and dry thickness and bulk of Examples 1, 3 and 6 are similar to or better than the multi-bond airlaid, coform and particularly the airlaid commercial wipes, even allowing for the impact of the converting process.

TABLE I

COMPARISON WITH COMPETITIVE WIPING MATERIALS

| | CVS ® Baby Wipes | Members Mark ® Moist Pop-ups | Huggies ® Natural Care | Walmart Equate ® Pop-ups | Ex. 1 | Ex. 6 | Ex. 3 |
|---|---|---|---|---|---|---|---|
| | | | Substrate Nonwoven Technology | | | | |
| | Airlaid | Multi-bond airlaid | Coform | Spunlace | 5/45/5 laminate | 5/45/5 laminate | 8/45/8 laminate |
| | | | Laminate structure? | | | | |
| | No | No | No | No | Yes | Yes | Yes |
| | | | Woodpulp Content, % | | | | |
| | >95 | 65 | 75 | 0 | 65 | 65 | 66 |
| Basis Weight, (gsm) | 43.5 | 64.8 | 66.0 | 50.8 | 59.5 | 56.6 | 63.8 |
| Dry Tensile Strength, MD (N/m) | 631 | 342 | 243 | 1353 | 357 | 402 | 463 |
| Wet Tensile Strength, MD (N/m) | 210 | 208 | 264 | 1668 | 300 | 363 | 426 |
| Wet Tensile Strength, CD (N/m) | 180 | 130 | 84 | 435 | 165 | 228 | 212 |
| Wet T.S. geometric mean (N/m) | 194 | 164 | 149 | 852 | 222 | 288 | 301 |
| Wet Toughness, MD (J) | 0.082 | 0.085 | 0.117 | 1.070 | 0.132 | 0.184 | 0.251 |
| Wet Toughness, CD (J) | 0.072 | 0.085 | 0.115 | 0.705 | 0.080 | 0.100 | 0.213 |
| Wet Elmendorf Tear Strength, MD (mN) | 600 | 1,160 | 840 | 5,880 | 1,120 | 1,400 | 1,240 |
| Dry Thickness (microns) | 273 | 492 | 550 | 426 | 641 | 620 | 725 |
| Dry Bulk (cc/g) | 6.3 | 7.6 | 8.3 | 8.4 | 10.8 | 10.9 | 11.4 |
| Wet Thickness (microns) | 256 | 421 | 488 | 411 | 501 | 472 | 516 |
| Wet Bulk (cc/g) | 5.9 | 6.5 | 7.4 | 8.1 | 8.4 | 8.3 | 8.1 |
| Absorption capacity (%) | 351 | 640 | 875 | 708 | 1,007 | 996 | 1,035 |
| Handle-o-Meter, Dry, MD (g.f) | 27 | 50 | 35 | 23 | 67 | 55 | 74 |
| Handle-o-Meter, Dry, CD (g.f) | 19 | 38 | 18 | 4 | 56 | 45 | 62 |
| Dry Martindale Abrasion Resistance (rubs) | 17 | 32 | 9 | 93 | 70 | 61 | 87 |
| Wet Martindale Abrasion Resistance (rubs) | 11 | 5 | 5 | 52 | 51 | 43 | 42 |
| Wet Lint, gravimetric method (ppm) | 13 | 64 | 197 | 35 | 35 | 28 | 18 |

It is recognised that the store purchased wipes have already been converted from roll goods to packaged wipes, and that the converting process may affect some properties such as thickness. In our experience, dry thickness is more impacted by the converting process than wet thickness. Typically dry thickness may reduce by 20-25% due to sheet compaction in some stages of the converting process, whereas wet thickness may reduce by a lesser percentage. However, other properties such as strength and abrasion resistance should be largely unaffected by the converting process. Dry properties of the commercial wipes were measured after allowing single sheets to air dry, after which they were placed in a conditioned room. Wet properties were measured on the wet wipes as received.

As expected due to its construction, the spunlace substrate has the best wet and dry Martindale abrasion resistance. Of the woodpulp containing substrates, Examples 1, 3 and 6 have the highest wet and dry Martindale abrasion resistance, only a little below the test results for the spunlace substrate, and are substantially better than the airlaid, multi-bond airlaid and coform samples.

The flexibility of the inventive laminates depends to some extent on the materials of construction and the chosen embossing pattern. Example 3 with 8 gsm outer meltspun layers is less flexible (higher Handle-o-Meter reading) than Examples 1 and 6 with 5 gsm outer meltspun layers. An alternate embossing pattern with, for example, a lower bond area will likely give a more flexible laminate. In general the Handle-o-Meter values for the inventive laminates are broadly similar to the other high woodpulp content substrates listed in Table I.

The inventive laminates, Examples 1, 3 and 6, have the highest measured absorption capacity, and almost the lowest wet lint level, the exception being the latex bonded airlaid sample.

The linting propensity of the woodpulp containing substrates was further investigated using the IEST test method IEST-RP-CC004.3, section 6.1.3 which measures the number of particles released into water. The test method also categorises the released particles by size (in microns), for example, in the range 0.5 to 1 micron, 1 to 2 microns, etc. Table J summarises the results of measurements made using the IEST protocol. The latex-bonded airlaid substrate released the smallest number of particles in water. Conversely, the coform substrate released the highest number of particles in water, and was particularly notable for releasing a number of particles in the larger particle size categories. By comparison, the multi-bond airlaid substrate and Examples 1 and 3 have intermediate results, with at least 90% of the released particles being 2 microns or smaller, a particle size barely visible to the human eye. As expected, Example 3 with two 8 gsm meltblown outer layers releases fewer particles than does Example 1 which has two 5 gsm meltblown outer layers.

TABLE J

RESULTS OF WET LINT TESTING BY PARTICLE COUNTER METHOD

| Sample description | CVS ® Baby Wipes | Members Mark ® Moist Pop-ups | Huggies ® Natural Care | Ex. 1 | Ex.3 |
|---|---|---|---|---|---|
| Substrate Nonwoven Technology | Airlaid | Multi-bond airlaid | Coform | 5/45/5 laminate | 8/45/8 laminate |
| Woodpulp Content, % | >95 | 65 | 75 | 65 | 66 |
| Number of particles 0.5-1 u (particles × $10^6$) | 304 | 1570 | 4380 | 1810 | 1290 |
| Number of particles 1-2 u (particles × $10^6$) | 55 | 497 | 1420 | 305 | 128 |
| Number of particles 2-5 u (particles × $10^6$) | 12 | 161 | 480 | 71 | 22 |
| Number of particles 5-10 u (particles × $10^6$) | 2 | 28 | 120 | 13 | 4 |
| Number of particles >10 u (particles × $10^6$) | 1 | 16 | 109 | 8 | 2 |
| Total Number of particles (particles × $10^6$) | 374 | 2272 | 6509 | 2207 | 1446 |

Those skilled in the art will understand that a new product design usually needs to go through one or more optimisation steps or processes to achieve a satisfactory balance of properties for the product's intended application. It should be recognised that the properties of the preceding Examples have not been fully optimised.

In summary, the inventive laminates exhibit a unique combination of valuable features useful in applications such as wipes or absorbent articles. Namely, (a) a high woodpulp content (>50%), and (b) high wet and dry thickness and bulk, and (c) high absorption capacity, and (d) high Martindale abrasion resistance, wet and dry, and (e) low linting propensity, together with good softness and drape, and tensile and tear strength adequate for the purpose of a wet or dry wipe. None of the competitive substrates offer the same useful and valuable features and combinations thereof with similar or better test values as various embodiments of the invention.

The invention claimed is:

1. A laminiferous nonwoven fabric, comprising:
   at least a first nonwoven layer, consisting essentially of natural cellulose fibres and thermoplastic fibres,
   on both sides of said first layer, a second and a third nonwoven layer, which second and third nonwoven layers consist essentially of melt-spinnable fibres and each second and third nonwoven layer having a basis weight of 12 gsm or less, wherein
   the first layer is formed by air forming process,
   at least one of the second or third nonwoven layers is formed separately and individually to be a self-supporting web with a geometric mean wet tensile strength/basis weight ratio of at least 7 N/m per gsm,
   the nonwoven fabric comprises at least 50% by weight cellulose, and
   the three webs are bonded together using ultrasonic, thermal or adhesive bonding.

2. The fabric of claim 1, wherein the fabric has a wet bulk of 7.5 cc/gram or higher.

3. The fabric of claim 1, wherein the fibres of the first nonwoven layer are shortcut fibres.

4. The fabric of claim 1, wherein the Wet Martindale abrasion resistance of the high cellulose content composite nonwoven fabric is better than 10 rubs.

5. The fabric of claim 1, wherein both the second and the third nonwoven layers have a basis weight of 12 gsm or less.

6. The fabric of claim 1, wherein both the second and the third nonwoven layers are manufactured with a high strength meltblown process.

7. The fabric of claim 1, wherein the first, second and third nonwoven layer are thermally, ultrasonically or by glueing bonded together to form a laminiferous nonwoven fabric and that the boundary between any two adjacent nonwoven layers is distinct.

8. The fabric of claim 1, wherein the basis weight of the laminiferous nonwoven fabric is less than 200 gsm.

9. The fabric of claim 1, wherein the first nonwoven layer comprise more than 75% w/w of cellulose fibres and less than 25% w/w of thermoplastic material.

10. The fabric of claim 1, wherein first, second and third layer comprise the same melt-spinnable material.

11. The fabric of claim 1, wherein the laminiferous nonwoven fabric has the absorption capacity of more than 900% by wt.

12. The fabric of claim 1, wherein the nonwoven fabric comprises at least 65% w/w cellulose fibres.

13. The fabric of claim 1, wherein the wet lint value of the fabric as measured by the gravimetric method is 35 ppm or less.

14. The fabric of claim 1, wherein the dry basis weight of the composite nonwoven fabric is between 40 gsm and 65 gsm and the outer nonwoven layers, each being a high strength meltblown polypropylene nonwoven web of about 6 gsm or less, the first nonwoven layer, being an airformed nonwoven web comprising a blend of debonded fluff pulp, and shortcut polypropylene fibres or a mixture of shortcut polypropylene fibres and shortcut polyethylene sheath/polypropylene core bicomponent fibres, the amount of debonded fluff pulp comprising between 70 to 90% w/w in the first nonwoven layer and wherein the three layers are bonded together by thermal or ultrasonic point-bonding and wherein the boundary between any two adjacent nonwoven layers is distinct in that fibres at or near the surfaces of such adjacent layers are not significantly intermingled.

15. The fabric of claim 1, wherein the first nonwoven layer is patterned before the three webs are brought together.

16. The fabric of claim 1, wherein the first layer is an essentially homogenous monolayer.

17. The fabric of claim 1, wherein the first layer is a stratified or layered structure, wherein thermoplastic materials are concentrated near top and bottom surfaces of the first nonwoven layer.

* * * * *